(12) United States Patent
Gally et al.

(10) Patent No.: US 7,508,571 B2
(45) Date of Patent: Mar. 24, 2009

(54) OPTICAL FILMS FOR CONTROLLING ANGULAR CHARACTERISTICS OF DISPLAYS

(75) Inventors: Brian J. Gally, San Rafael, CA (US); William J. Cummings, Millbrae, CA (US)

(73) Assignee: IDC, LLC, San Francisco, CA (US)

( * ) Notice: Subject to any disclaimer, the term of this patent is extended or adjusted under 35 U.S.C. 154(b) by 249 days.

(21) Appl. No.: 11/156,335

(22) Filed: Jun. 17, 2005

(65) Prior Publication Data

US 2006/0077123 A1 Apr. 13, 2006

Related U.S. Application Data

(60) Provisional application No. 60/613,535, filed on Sep. 27, 2004.

(51) Int. Cl.
*G02B 26/00* (2006.01)
(52) U.S. Cl. .................... 359/291; 359/292
(58) Field of Classification Search .......... 359/290, 359/291, 292, 295, 298, 220, 223, 224, 320, 359/322, 324, 900
See application file for complete search history.

(56) References Cited

U.S. PATENT DOCUMENTS

| | | | |
|---|---|---|---|
| 5,481,385 A | 1/1996 | Zimmerman et al. | |
| 5,517,347 A | 5/1996 | Sampsell | |
| 5,754,260 A | 5/1998 | Ooi | |
| 5,835,255 A | 11/1998 | Miles | |
| 5,835,256 A | 11/1998 | Huibers | |
| 5,986,796 A | 11/1999 | Miles | |
| 6,040,937 A | 3/2000 | Miles | |
| 6,538,813 B1 | 3/2003 | Magno et al. | |
| 6,650,455 B2 | 11/2003 | Miles | |

(Continued)

FOREIGN PATENT DOCUMENTS

DE 3402746 A1 8/1985

(Continued)

OTHER PUBLICATIONS

ISR and WO in PCT/US2005/031238 filed on Sep. 1, 2005.

(Continued)

*Primary Examiner*—Ricky Mack
*Assistant Examiner*—Tuyen Q Tra
(74) *Attorney, Agent, or Firm*—Knobbe Martens Olson & Bear LLP

(57) ABSTRACT

In various embodiments of the invention, an interferometric display device is provided having an external film with a plurality of structures that reduce the field-of-view of the display. These structures may comprise, for example, baffles or non-imaging optical elements such as compound parabolic collectors. The baffles may comprise a plurality of vertically aligned surfaces arranged, e.g., in a grid. In certain preferred embodiments these baffles are opaque or reflective. These vertical surfaces, therefore, can substantially block light from exiting the interferometric display device in a substantially non-perpendicular direction. These vertical surfaces may, however, permit light directed in a substantially vertical direction to exit the display. The non-imaging optical elements, e.g., compound parabolic collectors, redirect light from large incident angles into more normal angles towards the display. As a result, the light reflected by the display to the user is also at a more normal angle.

21 Claims, 20 Drawing Sheets

U.S. PATENT DOCUMENTS

| | | | |
|---|---|---|---|
| 6,674,562 B1 | 1/2004 | Miles | |
| 6,760,135 B1 * | 7/2004 | Payne et al. | 359/15 |
| 7,072,093 B2 * | 7/2006 | Piehl et al. | 359/290 |
| 7,123,216 B1 | 10/2006 | Miles | |
| 2002/0024711 A1 | 2/2002 | Miles | |
| 2002/0126364 A1 | 9/2002 | Miles | |
| 2003/0107692 A1 | 6/2003 | Sekiguchi | |
| 2003/0193630 A1 | 10/2003 | Chiou | |
| 2004/0115339 A1 | 6/2004 | Ito | |
| 2004/0125281 A1 | 7/2004 | Lin | |
| 2006/0066935 A1 | 3/2006 | Cummings et al. | |
| 2006/0067600 A1 | 3/2006 | Gally et al. | |

FOREIGN PATENT DOCUMENTS

| | | |
|---|---|---|
| EP | 0 855 745 | 7/1998 |
| EP | 1 014 161 | 6/2000 |
| JP | 62-009317 | 1/1987 |
| JP | 2001305312 | 10/2001 |
| WO | WO 95/01584 | 1/1995 |
| WO | WO 95/14256 A1 | 5/1995 |
| WO | WO 2004/036270 A1 | 4/2004 |

OTHER PUBLICATIONS

Restriction Requirement in U.S. Appl. No. 11/213,644 mailed on Jan. 7, 2008.

ISR and WO in PCT/US2005/032886 filed on Sep. 14, 2005.

* cited by examiner

OPTICAL FILMS FOR CONTROLLING ANGULAR CHARACTERISTICS OF DISPLAYS

RELATED APPLICATIONS

This application claims priority to U.S. Provisional Application No. 60/613,535, titled "External Optical Film for Interferometric Modulator System," filed Sep. 27, 2004, which is incorporated by reference, in its entirety.

BACKGROUND OF THE INVENTION

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, a display is provided, the display comprising: a light-modulating array comprising a plurality of light-modulating elements including first and second optical surfaces, the second optical surface movable with respect to the first optical surface; and a plurality of elements configured to limit a field-of-view of the display.

In another embodiment, a display is provided, the display comprising: a light-modulating array comprising a plurality of light-modulating elements including first and second optical surfaces, the second optical surface movable with respect to the first optical surface; and a diffuser element forward of the array configured to diffuse light such that light incident on the diffuser element is directed to the light-modulating elements more collimated than the incident light.

In another embodiment, a method of manufacturing a display is provided, the method comprising: forming a light-modulating array comprising a plurality of light-modulating elements including first and second optical surfaces, the second optical surface movable with respect to the first optical surface; and forming a plurality of elements configured to limit a field-of-view of the display.

In another embodiment, a method of manufacturing a display is provided, the method comprising: forming a light-modulating array comprising a plurality of light-modulating elements including first and second optical surfaces, the second optical surface movable with respect to the first optical surface; and forming a diffuser element forward of the array configured to receive light incident at a wide range of angles and direct the light into at a narrower range of angles onto the light-modulating elements.

In another embodiment, a display is provided, the display comprising: a light-modulating array comprising a plurality of light-modulating elements including first and second optical surfaces, the second optical surface movable with respect to the first optical surface; and means for limiting the field-of-view of the light-modulating elements.

BRIEF DESCRIPTION OF THE DRAWINGS

FIGS. 14B1 and 14B2 show different configurations for delivering light from a light source to the interferometric modulators device.

DETAILED DESCRIPTION OF CERTAIN EMBODIMENTS OF THE INVENTION

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

In various embodiments of the invention, an interferometric display device is provided having an external film with a plurality of structures that reduce the field-of-view of the display. These structures may comprise, for example, baffles or non-imaging optical elements such as compound parabolic collectors. The baffles may comprise a plurality of vertically aligned surfaces arranged, e.g., in a grid. In certain preferred embodiments these baffles are opaque or reflective. These vertical surfaces, therefore, can substantially block light from exiting the interferometric display device in a substantially non-perpendicular direction. These vertical surfaces may, however, permit light directed in a substantially vertical direction to exit the display. The non-imaging optical elements, e.g., compound parabolic collectors, redirect light from large incident angles into more normal angles towards the display. As a result, the light reflected by the display to the user is also at a more normal angle.

Figure 1:
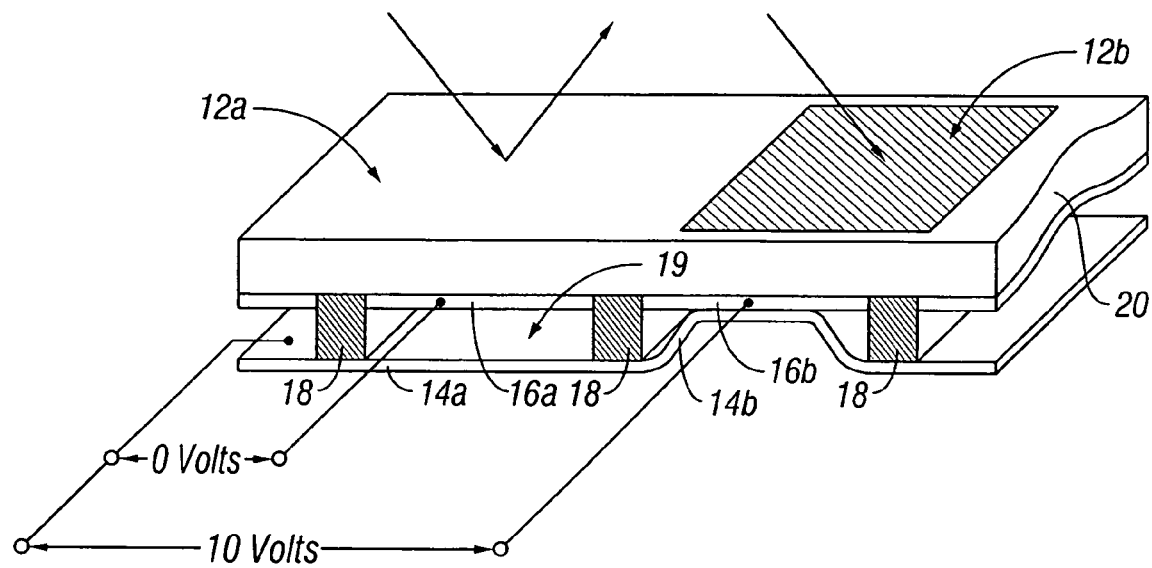
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
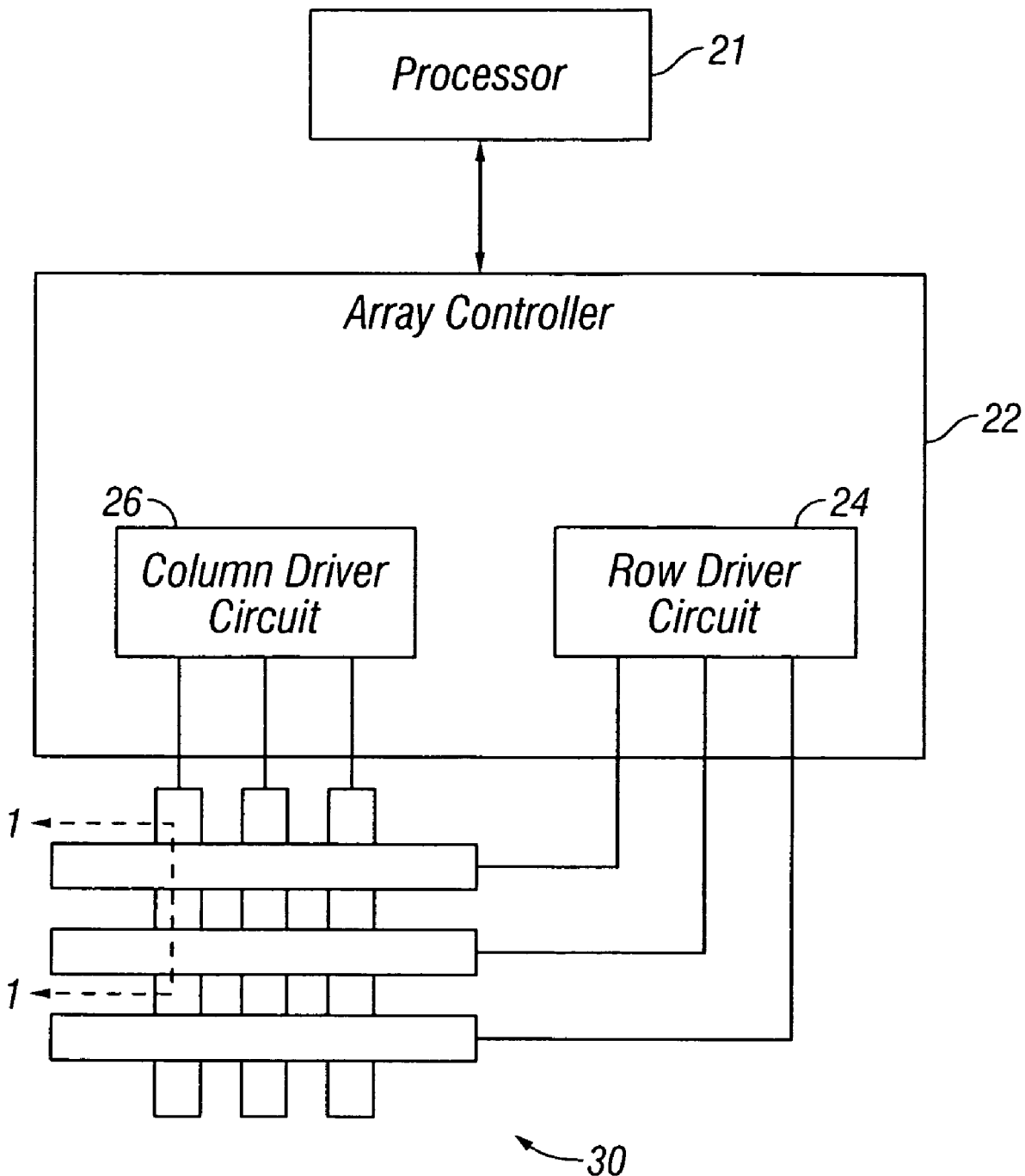
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
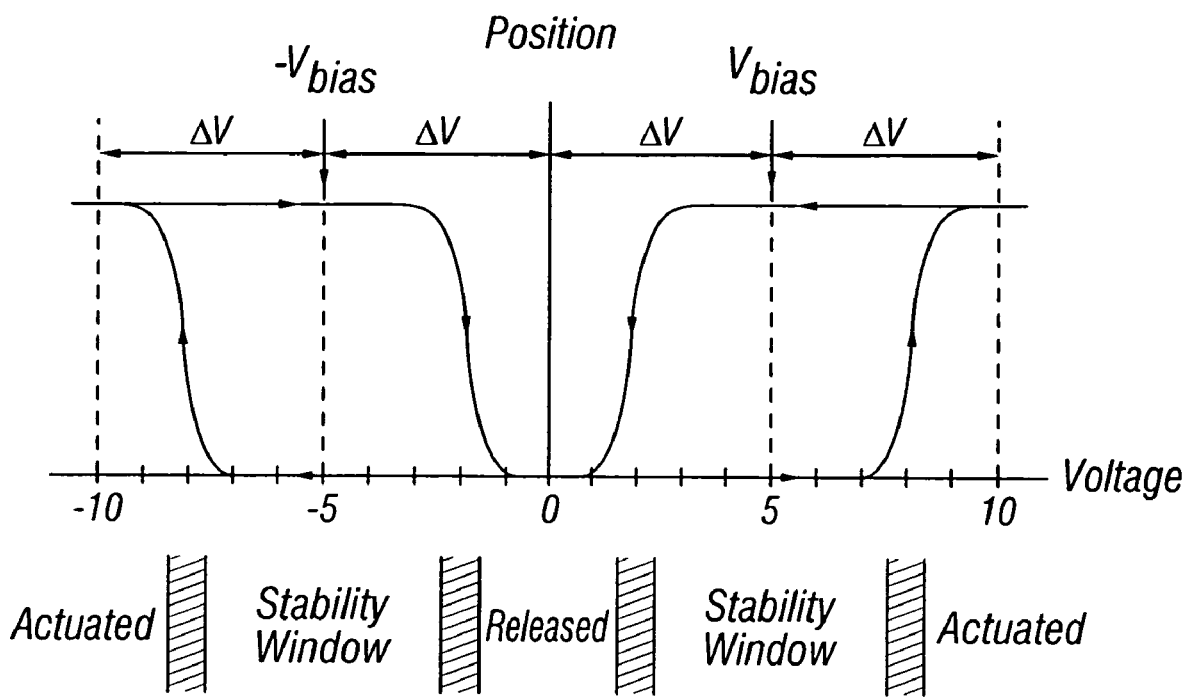
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
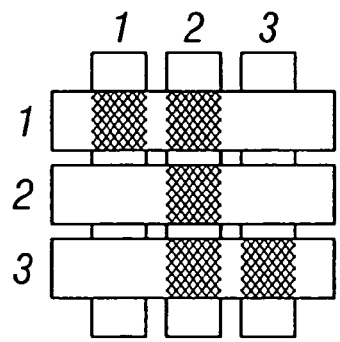
FIGS. 5A and 5B illustrate one exemplary timing diagram for row and column signals that may be used to write a frame of display data to the 3×3 interferometric modulator display of FIG. 2.
Figure 5B:
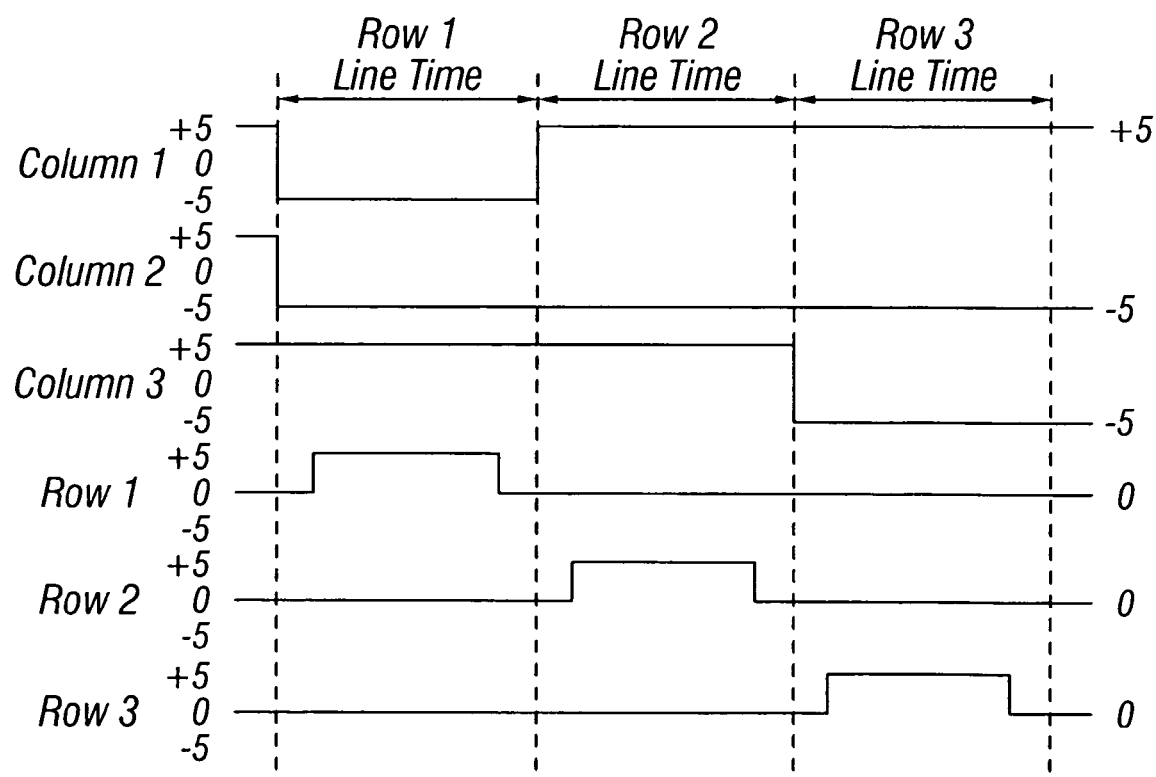

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
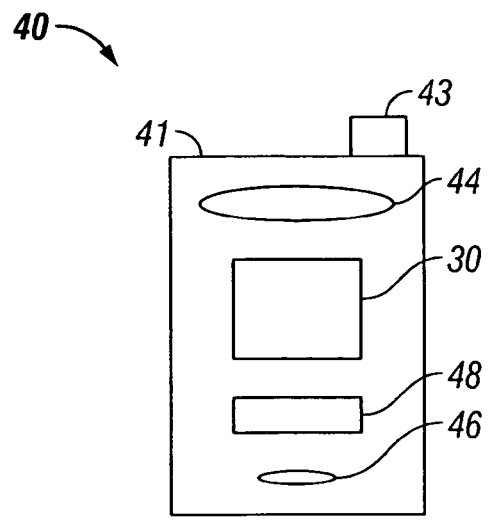
FIGS. 6A and 6B are system block diagrams illustrating an embodiment of a visual display device comprising a plurality of interferometric modulators.
Figure 6B:
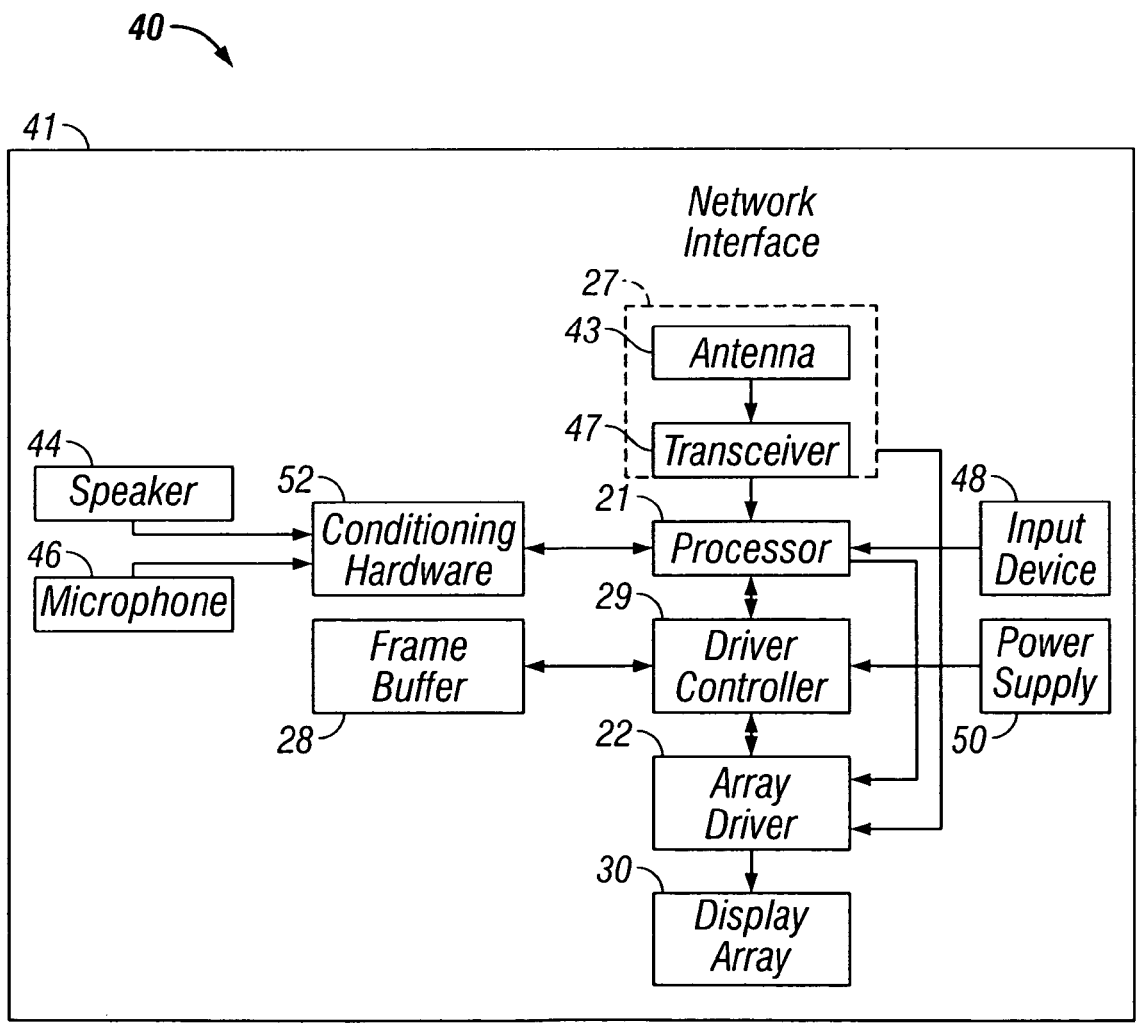

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
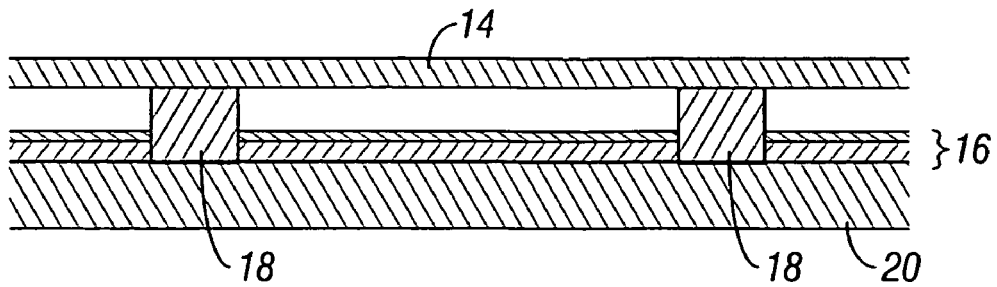
FIG. 7A is a cross section of the device of FIG. 1.
Figure 7B:
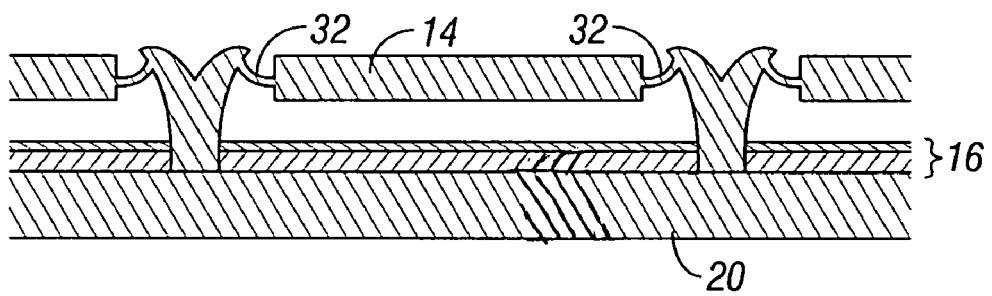
FIG. 7B is a cross section of an alternative embodiment of an interferometric modulator.
Figure 7C:
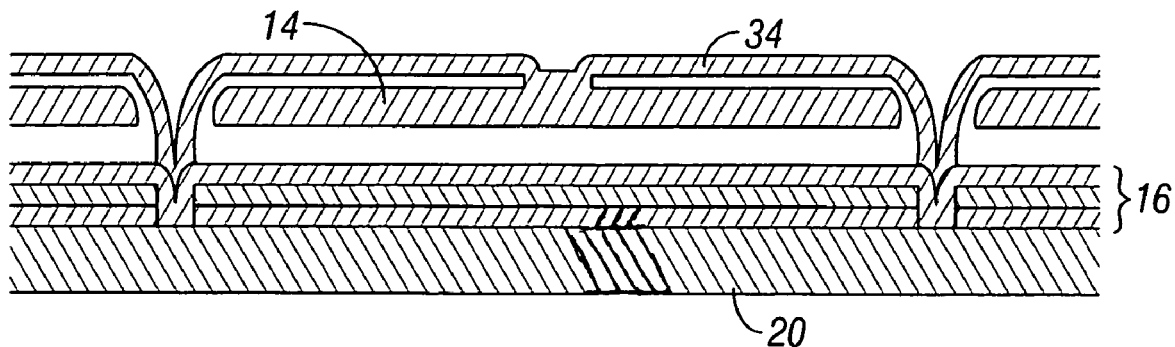
FIG. 7C is a cross section of another alternative embodiment of an interferometric modulator.
Figure 7D:
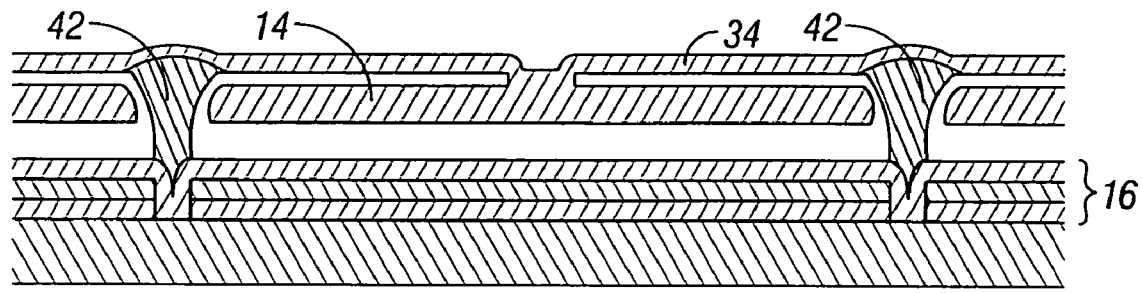
FIG. 7D is a cross section of yet another alternative embodiment of an interferometric modulator.
Figure 7E:
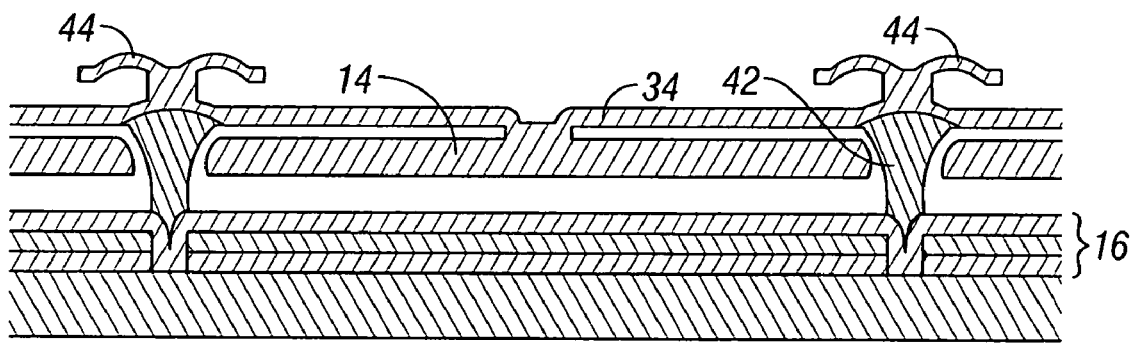
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As described above, a picture element (pixel) from a direct-view display may comprise elements such as the one shown in FIGS. 7A-7E. In various embodiments, these modulator elements with the mirror 14 in an undeflected state will be bright, or 'ON.' When the mirror 14 moves to its full design depth into the cavity toward the front surface of the cavity, the change in the cavity causes the resulting pixel to be 'dark' or OFF. For color pixels, the ON state of the individual modulating elements may be white, red, green, blue, or other colors depending upon the modulator configuration and the display color scheme. In some embodiments using red/green/blue (RGB) pixels, for example, a single color pixel comprises a number of modulator elements that create interferometric blue light, a similar number of elements that create interferometric red light, and a similar number that create interferometric green light. By moving the mirrors according to display information, the modulator can produce full color images.

Various embodiments, include improvements that can be made to an interferometric modulator device using various optical films. The optical films include films that come on rolls or in sheets. The film is attached to or near the interferometric modulator, and positioned so that light reflected from the interferometric modulator passes through the film as it propagates to a viewer. The optical films can also include coatings that are spread, sputtered or otherwise deposited on a surface of the interferometric modulator so that light reflected from the interferometric modulator passes through the film as it propagates to a viewer.

The films are generally disposed on an external surface of the interferometric modulator so that desirable optical characteristics can be achieved without changing the interferometric modulator itself. "External" as used herein refers to a placement of the film outside of the fabricated interferometric modulator, e.g., on the outer surface of the substrate of an interferometric modulator, such that the external film can be applied after fabricating the interferometric modulator display. The external film may be disposed on or near the surface of the interferometric modulator which first receives incident light, which is referred to herein as the outer surface of the interferometric modulator. This outer surface is also the surface that is positioned proximal to a person viewing the interferometric modulator. The external film may be on the layers that form the interferometric modulator or may be formed on one or more layers formed on the interferometric modulator. Although various embodiments are generally described herein as being external to the interferometric modulator display, these types of films can also be fabricated inside the interferometric modulator in other embodiments, and/or characteristics of the external films described can be incorporated into the interferometric modulator, e.g., during fabrication of the interferometric modulator, to achieve a similar effect.

Figure 8A:
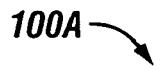
FIG. 8A is side view of a display device with an external film.
Figure 8A:
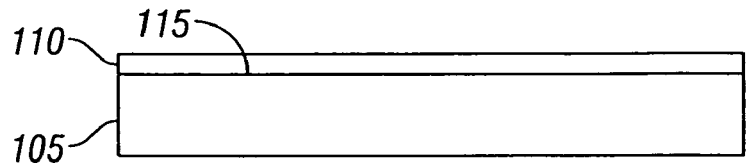

As illustrated in FIG. 8A, one embodiment of a display 100A includes a spatial light modulator 105 and an external film 110 positioned on or near the outer surface 115 of the spatial light modulator 105. The spatial light modulator 105 is a representation of an interferometric modulator device that may include, for example, a substrate, a conductor layer, a partial reflector layer, a dielectric layer and movable reflectors (referred to also as mirrors) configured with a gap between the movable mirrors and the dielectric. The spatial light modulator 105 may be, but is not limited to, a full color, monochrome, or black and white interferometric modulator display device. The design and operation of interferometric modulators are described in detail, e.g., in U.S. Pat. Nos. 6,650,455, 5,835,255, 5,986,796, and 6,055,090, all of which are incorporated herein by reference.

The external film 110 can be fabricated in a variety of ways, including for example, using fabrication techniques where the external film 110 is poured, spun, deposited on or laminated to the display. In some embodiments, the external film 110 is a single film layer, while in other embodiments the external film 110 includes more than one film layer. If the external film 110 comprises more than one film layer, each film layer can have different properties that affect one or more characteristics of light reflecting from the spatial light modulator 105 and propagating through the external film 110. Each layer of a multi-layer external film 110 can be fabricated by the same film fabrication technique or a different film fabrication technique, for example, any single layer can, for example, be poured, spun, deposited on or laminated to an adjacent layer. Other orientations and configurations are also possible.

Figure 8B:
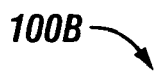
FIG. 8B is a side view of an interferometric modulator device configured for displaying information in RGB color.
Figure 8B:
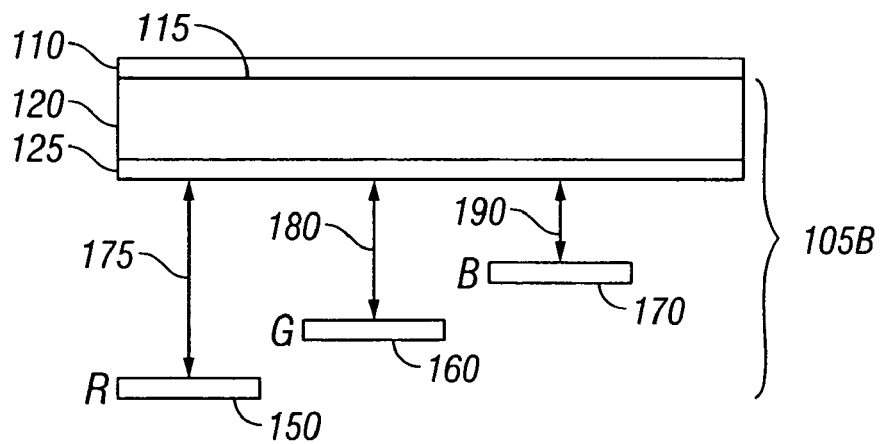

Referring to FIG. 8B, one embodiment of a display 100B has an external film 110 above an outer surface 115 of an RGB spatial light modulator 105B comprising color interferometric modulators. In this embodiment, the RGB spatial light modulator 105B comprises a substrate 120 above a multilayer 125 comprising, for example, a conductive layer (which is at least partially transmissive), a partially reflecting layer, and dielectric layer 125, which in turn is above a set of reflectors (e.g. mirrors) that includes red 150, green 160, and blue 170 reflectors, each with a different gap width 175, 180, 190, respectively, that correspond to the colors red, green, and blue. In certain embodiments, the substrate 120 can be between the external film 110 and the reflectors 150, 160, 170, as depicted in FIG. 8B. In other embodiments, the reflectors 150, 160, 170 can be between the external film 110 and the substrate 120.

Figure 8C:
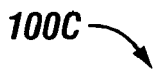
FIG. 8C is a side view of an interferometric modulator device configured for displaying information in black and white.
Figure 8C:
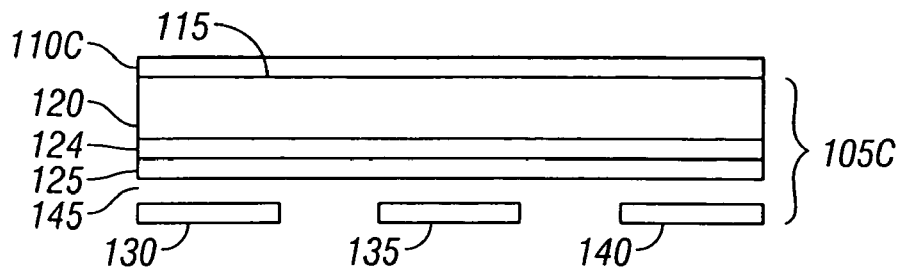

In other embodiments, the external film may be disposed above the monochrome or black and white interferometric modulator. As illustrated by FIG. 8C, the monochrome or black and white spatial light modulator 105C comprises a substrate 120 above a conductive layer, a partially reflective layer 124, a dielectric layer 125, which in turn is above a set of reflectors (e.g. mirrors) 130, 135, 140. The monochrome spatial light modulator 105C can be fabricated to have reflectors 130, 135, 140 configured with a single gap width 145 between the reflectors 130, 135, 140 and the dielectric layer 125.

In certain embodiments, the external film can diffuse light reflecting from the interferometric modulator display. The light reflecting from the interferometric modulator display may be at least partially diffuse so that the display has an appearance similar to paper (e.g., the display appears diffusely reflecting).

Figure 9:
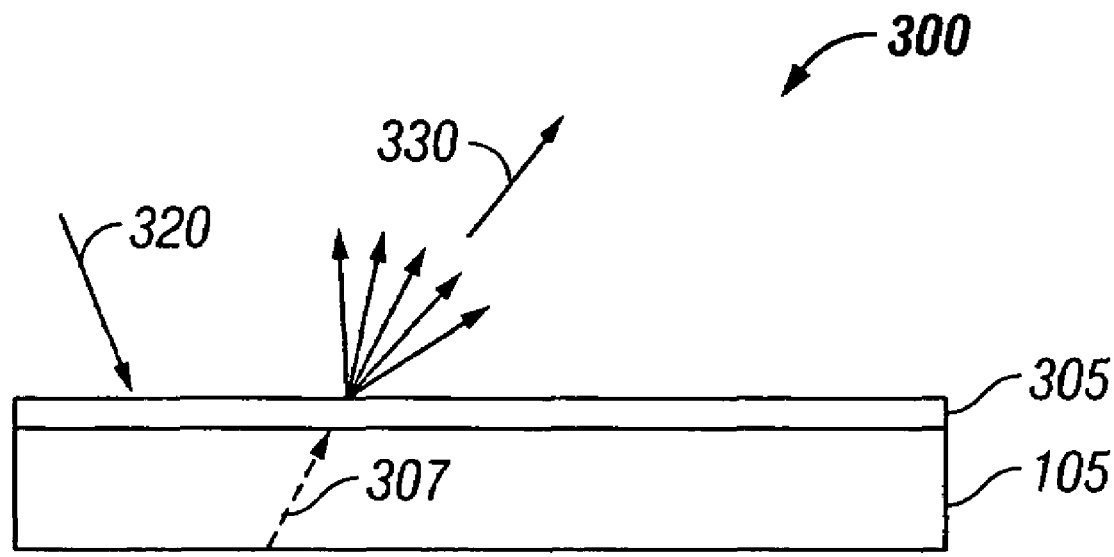
FIG. 9 is a side view of an interferometric modulator device configured with a light diffuser on its outer surface.

Referring to FIG. 9, a display 300 can include an external diffuse film 305 positioned on the spatial light modulator 105. Light 320 incident on the display 300 is specularly reflected by reflective spatial light modulator 105. As the specularly reflected light 307 propagates from the display 300, diffuse film 305 changes the characteristics of the specularly reflected light 307, which is transformed into diffuse light 330. The diffuser 305 also diffuses light incident on the interferometric modulators.

Diffuse film 305 can be fabricated from a number of materials, and can include one or more layers of diffuse material. The diffuser 305 may include material with surface variation (e.g. corrugations and roughness) or variation in material. This variation can refract or scatter light in different embodiments. A wide variety of diff-users 305 are possible and not limited to those recited herein.

Figure 10:
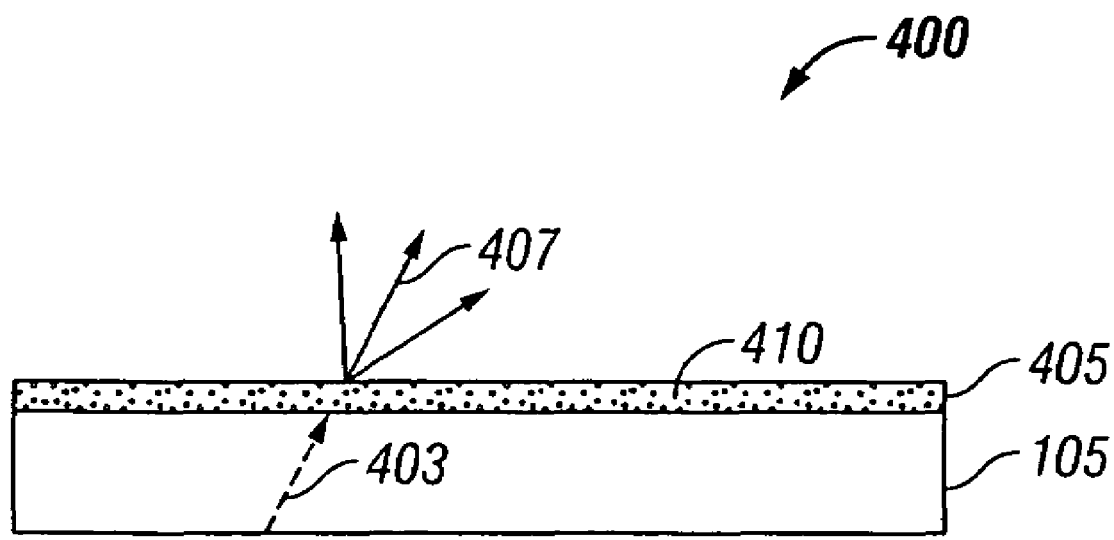
FIG. 10 is a side view of an interferometric modulator device configured with a light diffuser on its outer surface, where the light diffuser includes diffusing particles.

FIG. 10 illustrates an exemplary embodiment of a display 400 that produces diffuse reflected light. The display 400 includes an external film 405 attached to a spatial light modulator 105. The external film 405 includes material 410 comprising scattering features (e.g., particles) that scatter the light 403 reflecting from the spatial light modulator 105 to change the character of the light 407 emitted from the interferometric modulator device from specular to diffuse.

In some embodiments, the external diffuse film 305 includes a material that changes the spectral characteristics of the reflected light 403 and a material that changes the diffuse or specular characteristics of the reflected light. Such material can be included in a single layer of the external film 305, 405 (FIGS. 9 and 10). Alternatively, material that changes the spectral characteristics of the reflected light can be incorporated in one layer of the external film 305 and material that changes the diffuse or specular characteristics of reflected light can be incorporated in a separate layer of external film. In one embodiment, the diffuse material can be included in an adhesive that is used between the external film 305 and the spatial light modulator 105 (FIG. 9).

As mentioned above, some type of diffuser is useful on interferometric modulator displays where it is desired that the display 300, 400 has the appearance of paper rather than the appearance of a mirror. Of course, in some embodiments it can be desirable for the appearance of the display 300, 400 or a portion of the display to be highly reflective or "mirror-like," and in these embodiments the display may have a diff-use film 305, 405 covering all or only a portion of the interferometric display device 305, 405. In some embodiments, an optically transmissive layer is "frosted" in order to achieve the desired diffusion. For example, the outer surface of the display 105 (FIG. 9) can be frosted to provide diffusion of the reflected light. If the surface is heavily frosted, the light will be diff-used more than if the surface is lightly frosted. In some embodiments, the optically transmissive layer that is frosted may comprise a glass or polymer layer.

Figure 11A:
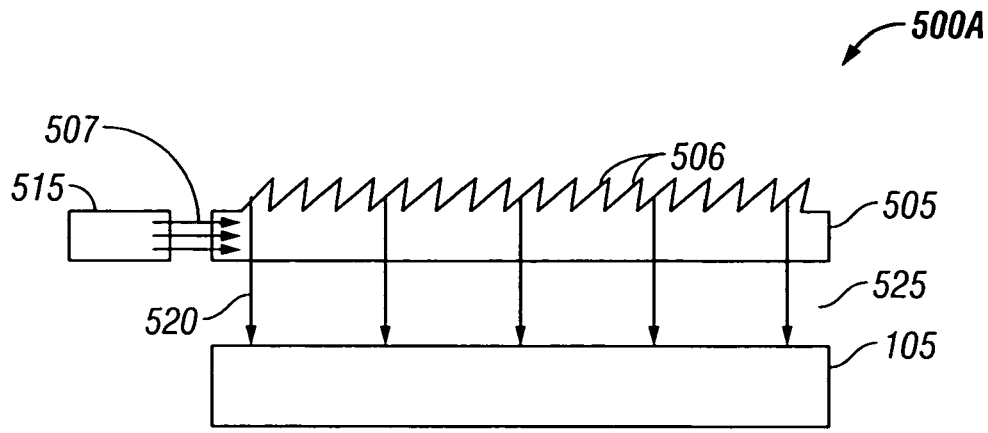
FIG. 11A is a side view of an interferometric modulator device configured with a grooved front light plate that is separated from the interferometric modulator device by an air gap.

In some embodiments, it can be advantageous to include a light source (referred to herein as a "front light") to provide additional light to the interferometric modulator, e.g., for viewing the interferometric modulator in dark or low ambient lighting conditions. Referring to FIG. 11A, one embodiment of a display 500A includes a light source 515 positioned on the side of a front plate 505. This front plate 505 comprises material substantially optically transmissive to light 507 from the light source 515. The front plate 505 may comprise, for example, glass or plastic in some embodiments. The front plate 505 has optical features (e.g., contours such as grooves) configured to disrupt propagation of light in the front plate and redirect the light toward the interferometric modulator display device 105. An air gap 525 separates the contoured/grooved front plate 505 from the spatial light modulator 105. Operationally, the light source 515 provides light 507 into the front plate 505, where the light 520 reflects off the slanted surface features 506 and travels towards the spatial light modulator 105. For ambient light entering the display 500, the air gap 525 reduces the perceived contrast of the display 500A because of the differences in the index of refraction between the air in the air gap 525 and the materials which are used to form the front plate 505 and the spatial light modulator 105.

Figure 11B:
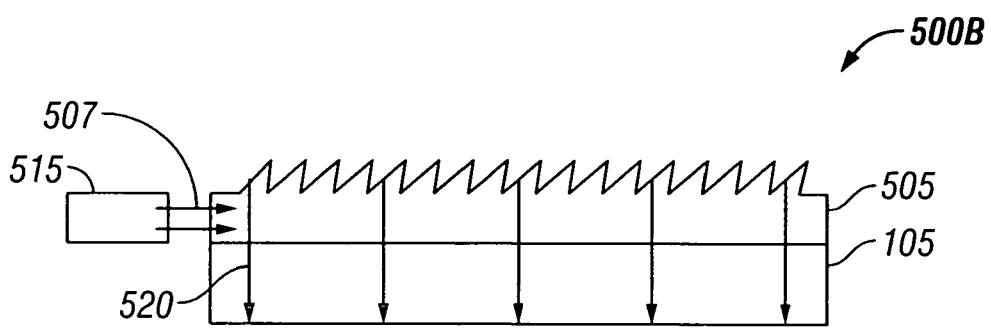
FIG. 11B is a side view of an interferometric modulator device configured with a grooved front light plate connected to the interferometric modulator device.

Referring to FIG. 11B, the display 500B provides for a more efficient transmission of light to the spatial light modulator 105 because it does not have an air gap separating the front plate 505 and the display 105. Instead, the front plate 505 is attached to the spatial light modulator 105. While the configuration of display 500B increases the transmission of light to the spatial light modulator 105, attaching the two pieces is not a good manufacturing practice because the front plate 505 and the spatial light modulator 105 are both relatively expensive pieces, and if either piece exhibits a failure during manufacturing both pieces are lost.

Figure 11C:
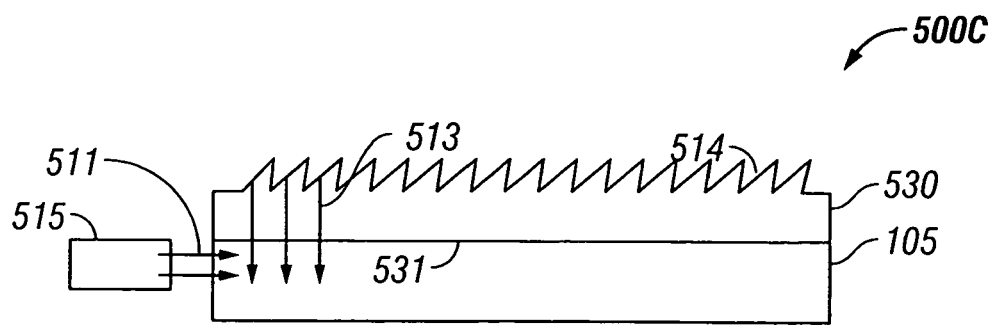
FIG. 11C is a side view of an interferometric modulator device configured with an external film which has a contoured outer surface so that light provided from a light source is redirected to the interferometric modulator device and reflected out of the interferometric modulator to a viewer.

Referring now to FIG. 11C, display 500C illustrates how the problems experienced by the displays 500A, 500B of FIGS. 11A and 11B are overcome using an external film rather than a front plate. As shown in FIG. 11C, the display 500C includes a light source 515 positioned next an edge 531 of spatial light modulator 105 to which is laminated an external film 530, which has a surface 514 comprising optical features such as contouring, e.g., grooves or slanted surface features, configured to redirect light toward the spatial light modulator 105. The light source 515 may, for example, be disposed at an edge of a substrate supporting the interferometric modulator device 105. The external film 530 is attached to the spatial light modulator 105 or laminated onto the spatial light modulator 105. An adhesive may be used. The external film 530 is relatively inexpensive compared to the cost of a grooved front glass plate 505 (FIGS. 11A, 11B), so if the display 105 fails it can be disposed without a large additional loss. Operationally, the external film 530 receives light 511 from the light source 515. As the light propagates through the spatial light modulator 105 (e.g., the substrate of the interferometric modulator device) and the external film 530, the light 511 reflects off of an inner portion of the contoured/grooved surfaces 514 and the reflected light 513 propagates through the substrate of the interferometric modulator device and reflects off mirror surfaces of the interferometric modulators.

Figure 12A:
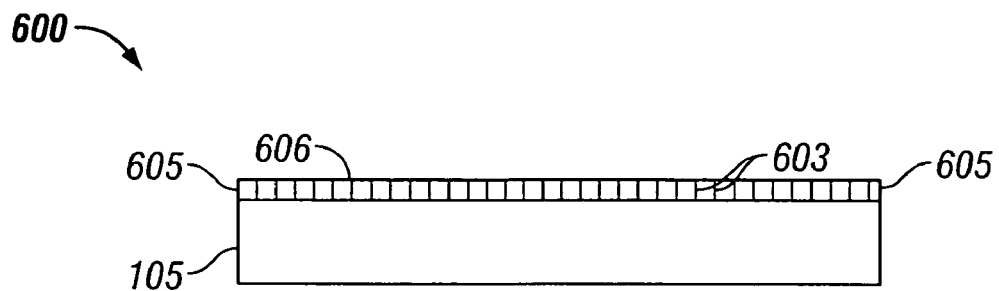
FIG. 12A is a side view of an interferometric modulator device configured with an external film that includes baffle structures that limit the field-of-view of the interferometric modulator device.

Referring now to FIG. 12A, in other embodiments a display 600 may comprise an external film 605 that is attached to the outer surface of the spatial light modulator 105, where the external film comprises a plurality of structures 603 that reduce or minimize the field-of-view of the display. In one embodiment, structures 603 are small vertically aligned obstructions which can be formed in a grid and "sunk" or diffused into the external film 605. In another embodiment, the material of the external film 605 provides the vertically aligned structures 603. These structures 603 may be referred to as baffles. The baffles 603 may be substantially opaque. The baffles 603 may be substantially absorbing or reflective.

Figure 12B:
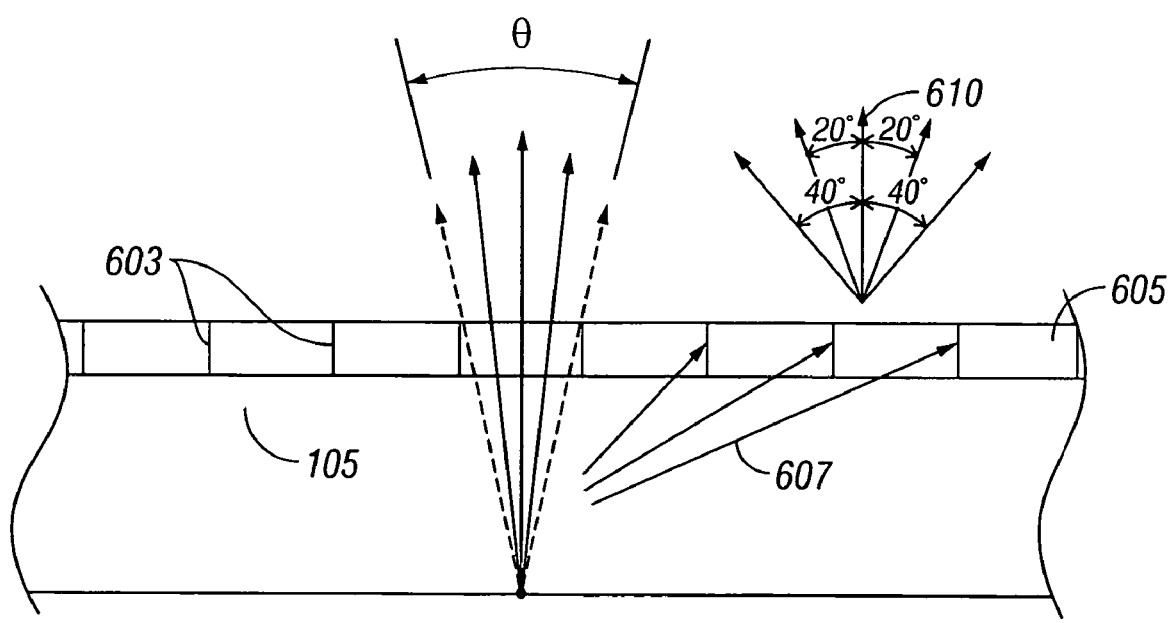
FIG. 12B is a side view of one embodiment of an interferometric modulator device showing how baffle structures contained in the external film limit the direction of the reflected light.

FIG. 12B illustrates how light reflected in a substantially non-perpendicular direction 607 is substantially blocked by the structures 603 from exiting the external film 605 and how light 609 reflected in a substantially vertical direction is not substantially obstructed by the structures 603. In the embodiment shown in FIGS. 12A and 12B, the field of view is limited depending on the shape (and orientation), size (e.g., length), and spacing of the baffle structures 603. For example, the baffles 603 may have a size, shape, and spacing to provide a field-of-view no more than about 20 degrees or no more than about 40 degrees as measured from a plane 610 normal to a front surface 606 of the display 600. The field-of-view may therefore be between about 20, 25, 30, 35 and 40 degrees or less as measured from the normal. In one exemplary embodiment, the baffles 603 provide the display 600 with a field-of-view of about 30 degrees. As used herein, the term baffle includes but is not limited to the structures 603 depicted in FIGS. 12A and 12B.

Figure 12C:
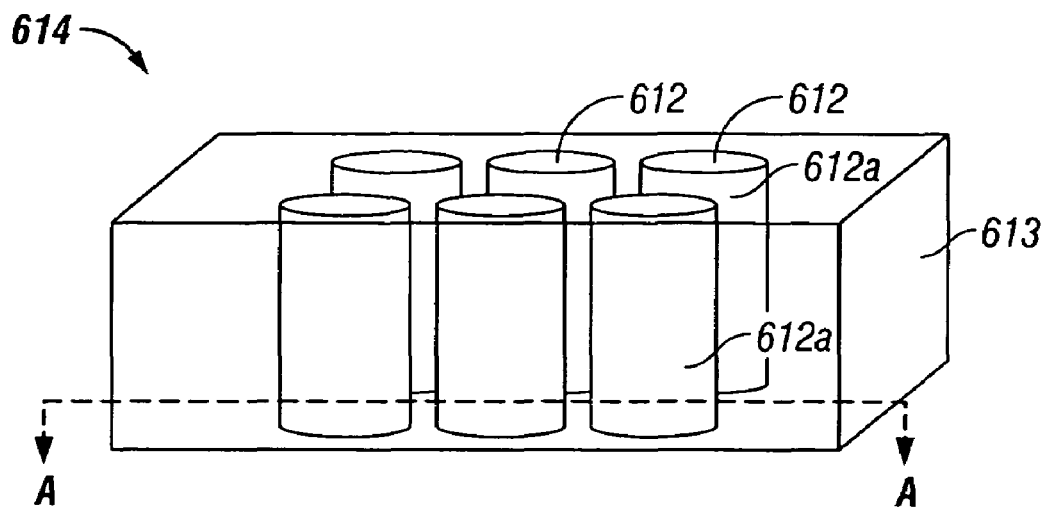
FIGS. 12C and 12D are embodiments of an external film having baffle structures comprising opaque columns.
Figure 12D:
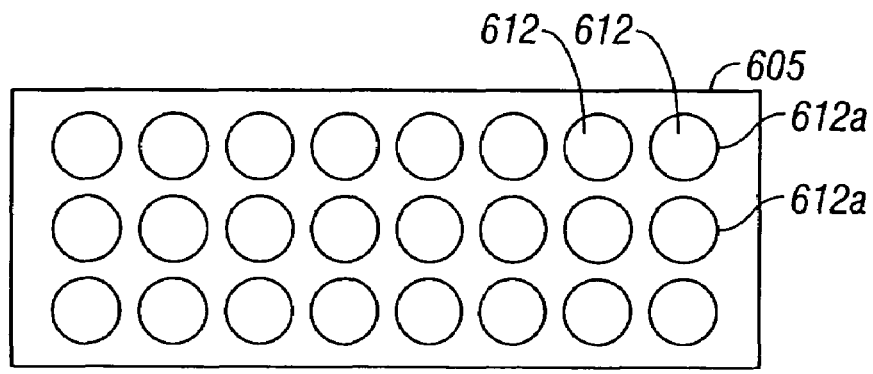

The baffle structures 603 may be constructed in accordance with embodiments depicted in FIGS. 12C and 12D. For example, a plurality of substantially vertically aligned columnar features 612 may comprise a transmissive material in the shape of columns having a coating of opaque material on an outer surface 612a of the column-shaped transmissive material. The columnar features 612 may be bundled together and aligned. The space between the vertically aligned columnar features 612 may be filled with a transmissive material such as polycarbonate, polyethylene terephtalate (PET), acrylic, or polymethylmethacrylate (PMMA) that forms a matrix 613 for these vertically aligned columnar features 612. The matrix 613 having the columnar features 612 disposed therein may be cut perpendicular across line A-A to produce a thin film. A top view of the section cut to form the external film 605 is depicted in FIG. 12D. In this embodiment, the opaque outer surface 612a of the columnar features 612 substantially block light exiting the external film 605 in substantially non-vertical directions.

Figure 12E:
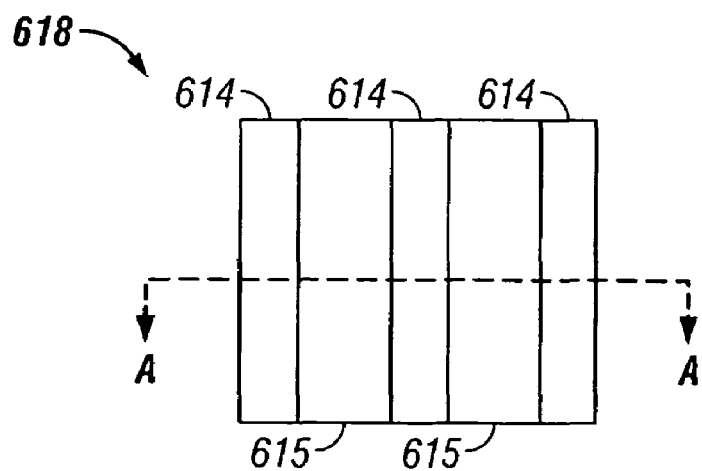
FIGS. 12E-12G are embodiments of external films having baffle structures comprising opaque portions.
Figure 12F:
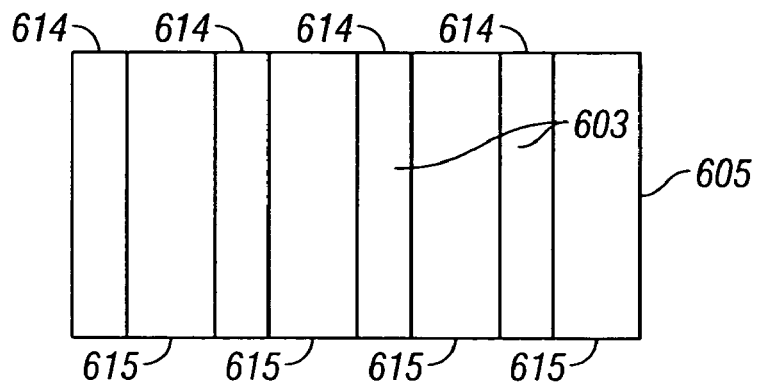

The baffle structures 603 may also be constructed in accordance with other embodiments such as described with reference to FIGS. 12E and 12F. In FIG. 12E, a multilayer structure 618 having a plurality of stacked layers is constructed. The multilayer structure 618 has alternating layers of a substantially transmissive material 615 and layers 614 of substantially opaque material. To fabricate this multilayer structure 618, an optically transmissive layer 615 that may comprise a slightly diffuse material is formed and an opaque layer 614 comprising of a substantially opaque material is formed thereon. These steps can be repeated until a desired number of layers have been formed. The multilayer structure 618 can then be cut perpendicular across line A-A. A top view of the section cut to form the external film 605 is depicted in FIG. 12F. The substantially opaque layers 614 form the baffles 603 that substantially block light exiting the external film 605 in a substantially non-vertical direction.

Figure 12G:
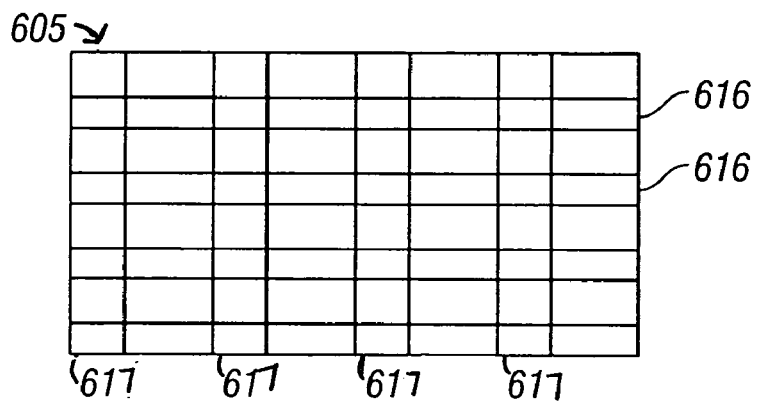

As depicted in FIG. 12G, the external film 605 comprises a two-dimensional grid comprising horizontal opaque layers 616 and vertical opaque layers 617. This two-dimensional grid may be fabricated using a pair of sections cut from the multilayer structure 618 (FIG. 12E) with one section disposed in front of the other such as depicted in FIG. 12F. One of the sections is oriented substantially perpendicular relative to the other external film structure 605. Other orientations and configurations are also possible.

Figure 12H:
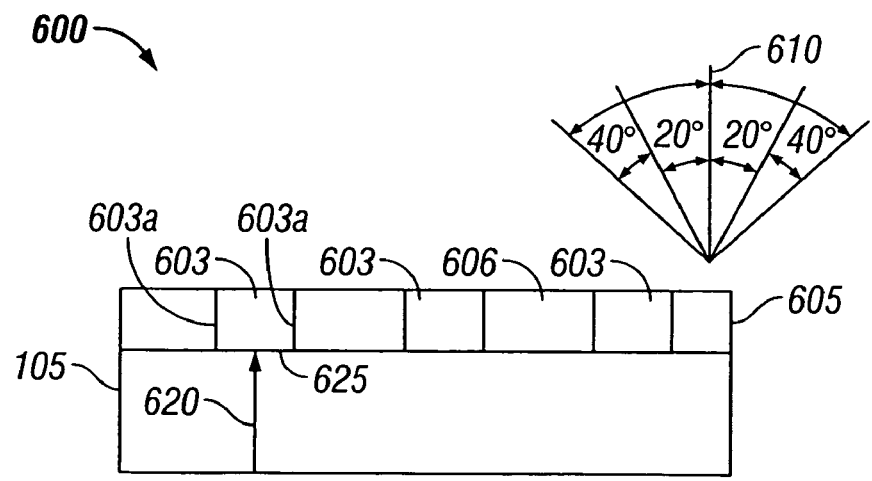
FIG. 12H depicts an external film having baffle structures comprising reflective material.

In certain embodiments, the baffle structures 603 shown in FIGS. 12C-12G may comprise reflective material. For example, referring to FIG. 12H, if a portion 625 of the baffle structures 603 nearest to the spatial light modulator 105 is substantially reflective, then light 620 reflected from the spatial light modulator 105 that is incident on the reflective portion 625 of the baffle will not pass through the external film structure 605, but will be reflected back to the spatial light modulator 105. Alternatively, the outer surfaces 603a and 603b of the baffle structures 603 may be made of a substantially reflective material, such as a flash coating of substantially reflective material on the baffle structures 603.

In this embodiment, the bottom portion 625 of the baffle structures 603 may also be flash coated with the substantially reflective material.

Figure 13A:
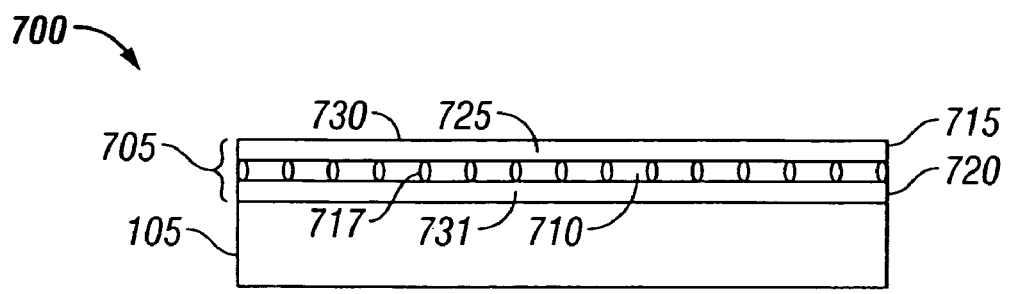
FIG. 13A is a side view of an interferometric modulator display that includes a touchscreen.

In some embodiments, an interferometric modulator can incorporate a user input device that can also change a characteristic of light reflected from the interferometric modulator. For example, the display 700 in FIG. 13A includes a touchscreen 705 which is connected to the outer surface of spatial light modulator 105. The touchscreen 705 includes an outer touchscreen portion 715 that has an outer touch surface 730 configured to receive touch signals from a user, and a touchscreen inner portion 720 which is attached to the display 105. The touchscreen inner portion 720 and touchscreen outer portion 715 are separated by a space 710 and held apart by spacers 717. For user input, the touchscreen 705 can operate in a manner well known in the art, e.g., a user applies pressure to the touch surface 730 on the other touchscreen portion 715, which makes contact with the touch screen inner portion 720 and activates a circuit which is configured to send a signal when activated. In addition to providing user input functionality, the touchscreen 705 can be configured with a light diffusing material 731 in the touchscreen inner portion 720 and/or a light diffusing material 725 in the touchscreen outer portion 715.

Figure 13B:
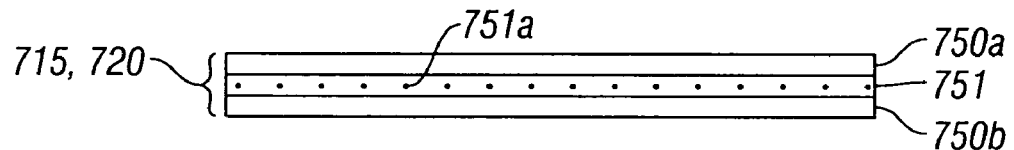
FIGS. 13B-D show different approaches for incorporating a diffusing material.
Figure 13C:
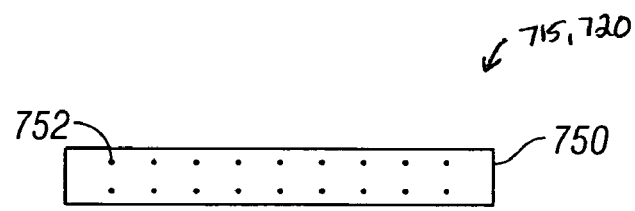
Figure 13D:
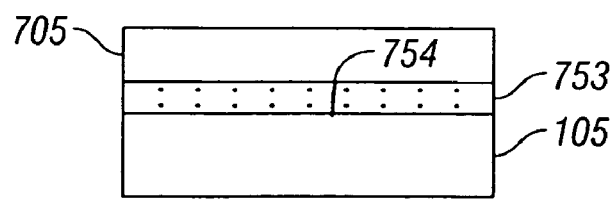

FIG. 13B is a side view of an embodiment of the touchscreen outer portion 715 and/or touchscreen inner portion 720 having a diffusing material. In this embodiment, the diffusing material is a diff-using adhesive 751 between an upper layer 750a and a lower layer 750b. The diffusing adhesive 751 may be an adhesive mixed with filler particles 751a that act as scatter centers for scattering light. Any suitable material that refracts, reflects, or scatters light may be used as the filler particles 751a. For example, the filler particles 751a may be made of materials such as, but not limited by, the following polymers: polystyrene silica, polymethyl-methacrylate (PMMA), and hollow polymer particles. In an alternative embodiment the diffusing adhesive 751 is configured to have air bubbles that refract light. In other embodiments, opaque non-reflective particles may be used. The upper 750a and/or lower 750b layers may comprise materials such as polycarbonate, acrylic, and polyethylene terephtalate (PET) as well as other materials. FIG. 13C is another embodiment of the touchscreen outer portion 715 and/or touchscreen inner portion 720 comprising a diffusing material, where diffusing material 752 is incorporated in a layer 750 that forms the upper and/or lower portions 715, 720 of the touchscreen. FIG. 13D is an embodiment where diffusing material 753 is between the touchscreen 705 and the spatial light modulator 105. For example, in FIG. 13D, the diffusing material 753 is coated on top of the outer surface 754 of the spatial light modulator 105. In this embodiment, the diffusing material 753 may be patterned on the outer surface 754 of the display 105, where the diffusing material 753 is between the outer surface 754 of the spatial light modulator 105 and the touchscreen 705. In some embodiments, the diffusing material 753 may be spun, e.g., on a glass outer surface of the spatial light modulator 105. In certain embodiments, the diffusing material may comprise scatter features mixed with an ultraviolet epoxy or thermally cured epoxy. When an epoxy is used, the diffusing material 753 may be filler particles mixed with the epoxy, where the filler particles act as scatter centers to scatter light. Other configurations are also possible.

Figure 14A:
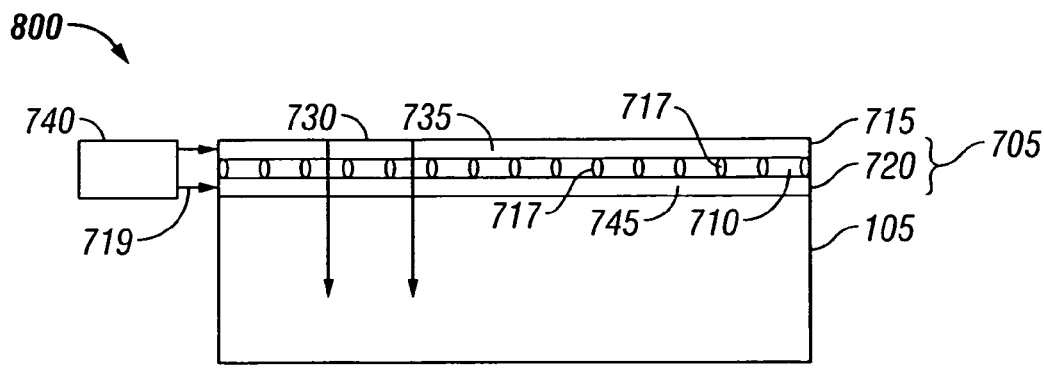
FIG. 14A is a side view of an interferometric modulator device configured with a touchscreen comprising diffuser material that scatters light from a light source toward the interferometric modulator device.

FIG. 14A shows an embodiment of a display 800 that includes a touchscreen 705 with an inner portion 720 attached to a spatial light modulator 105, which includes a substrate, and an outer portion 715 that has a touchscreen surface 730 for receiving user input. Spacers 717 are disposed in a gap 710 between the inner portion 720 and outer portion 715. The display 800 also includes a light source 740 configured to provide light 719 to the touchscreen 705, e.g., the inner portion 720, the outer portion 715, or both. In one embodiment, the touchscreen 705 can include optical structures that redirect the light 719 so that the light is incident on the spatial light modulator 105. In some embodiments, the optical structures comprise inclined or slanted surfaces inside the touchscreen 705. In some embodiments, total internal reflection (TIR) elements may be used. Also, in certain embodiments, the optical elements comprise particles that scatter light such that a portion of the scattered light is incident on the spatial light modulator 105. In some embodiments, the material 745 in the inner portion 720 and/or the material 735 in the outer portion 715 of the touchscreen 705 can include phosphorescent material. This phosphorescent material emits light when activated by the light 719 from the light source 740, providing light directly to the touchscreen 705 and to the spatial light modulator 105, which can then be reflected back to the touchscreen 705.

In other embodiments depicted in FIGS. 14B1 and 14B2, the display 800 with a touchscreen 705 may also include a contoured light guide. For example, in FIG. 14B1, the inner portion 720 of the touchscreen 705 may comprise a plate or layer 760*a* with a contoured, e.g., grooved, surface 765. This contoured surface 765 may include a plurality of slanted portions. This surface 765 may have, for example, a sawtooth shape. A transmissive material 760*b* may then be placed in the contours or grooves of the surface 765 to form a substantially planer surface 760*c* above the plate/layer 760*a*. The light source 740 directs light 719 into the plate or layer 760*a*, where the light 719 is optically guided. The light propagating in the plate 760*a* reflects off the slanted portion of the surface 765 and travels towards the spatial light modulator 105. In the embodiments using the light guiding plate or layer 760*a*, or any other suitable light guide, a diffuser material may be incorporated into the display 800 above or below the plate 760*a*. For example, the diff-using material may be within the outer portion 715 of the touchscreen 705 or on the outer surface 754 of the spatial light modulator 105.

In an alternative embodiment depicted in FIG. 14B2, the plate or layer 760*a* may be placed between the touchscreen 705 and the spatial light modulator 105. In this embodiment, the transmissive material 760*b* (FIG. 14B1) is not placed on the surface 765 of the plate 760*a*. Rather, air or vacuum occupies a cavity 760*c* between the plate/layer 760*a* and the touchscreen 705.

Figure 14C:
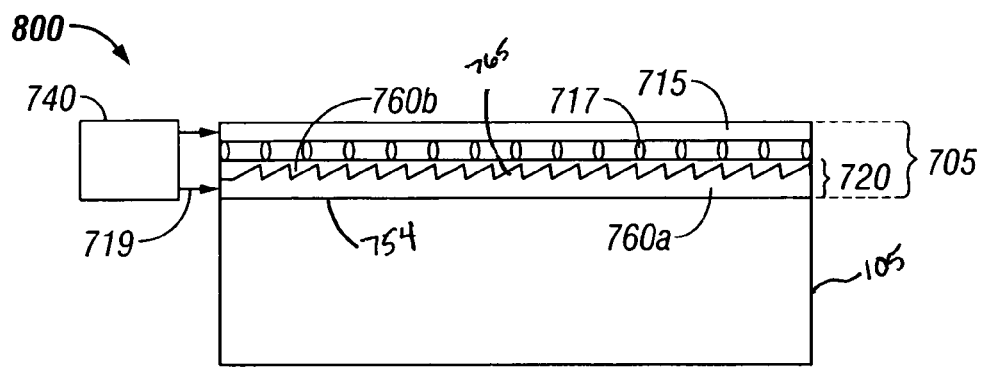
FIGS. 14C-E demonstrate different approaches for integrating diffusing material into displays for directing light from a light source to the interferometric display device.
Figure 14C:
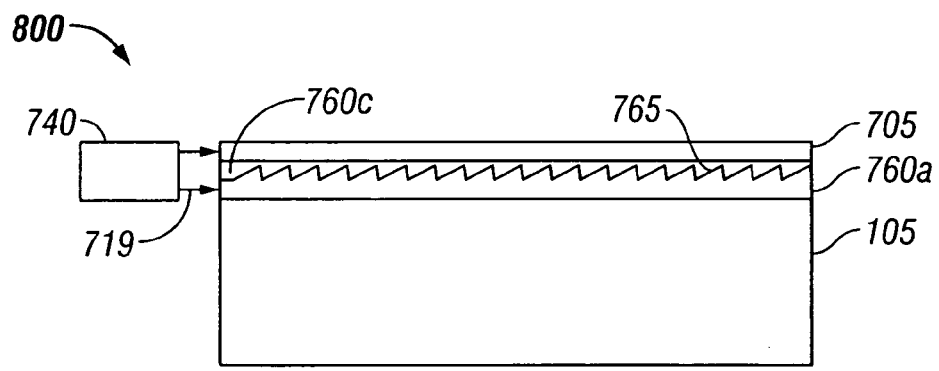
Figure 14C:
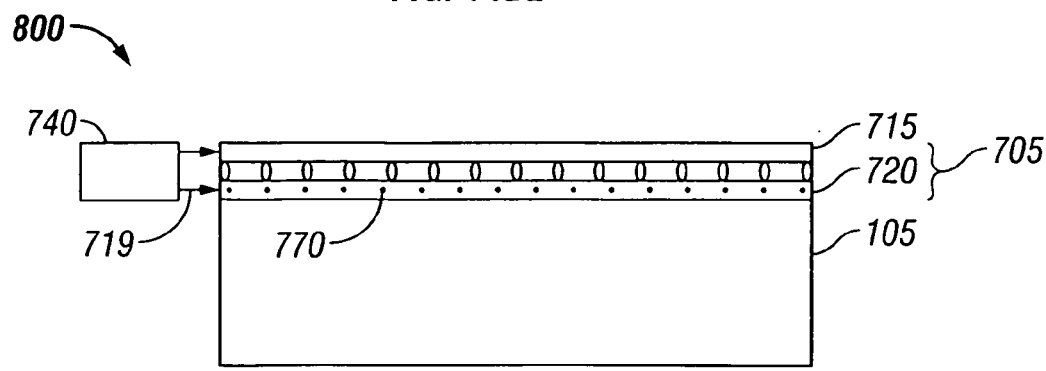
Figure 14D:
Figure 14E:
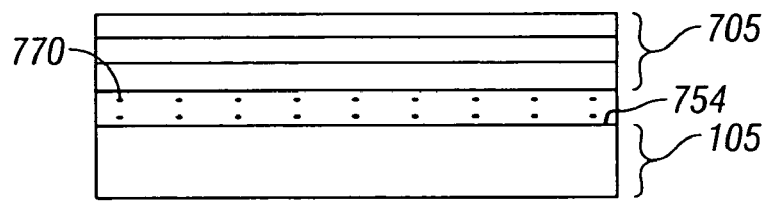

In another embodiment illustrated in FIG. 14C, light 719 for the light source 740 may be directed into an edge of the touchscreen 705 and may be guided through at least a portion of the touchscreen 705, and the touchscreen 705 may comprise features that redirect this light toward the spatial light modulator 105. For example, in FIG. 14C, the inner portion 720 of the touchscreen 705 may incorporate particles 770 that scatter the light toward the spatial light modulator 105. As illustrated by FIG. 14D, the inner portion 720 may be a multi-layered with particles 770 mixed in an adhesive between an upper layer 750*a* and a lower layer 750*b*. The upper 750*a* and/or lower 750*b* layers may comprise materials such as polycarbonate, acrylic, and polyethylene terephtalate (PET), or other materials. In other embodiments such as depicted in FIG. 14E, scatter features or particles 770 are coated on top of the outer surface 754 of the spatial light modulator 105. These scatter features or particles 770 may redirect light toward the movable reflectors of the interferometric modulators; see for example U.S. patent application Ser. No. 10/794,825, filed Mar. 5, 2004, and entitled "Integrated Modulator Illumination", which is hereby incorporated by reference. In this embodiment, the scatter features or particles 770 may be patterned on the outer surface 754 of the display 105, where the scatter features 770 are between the outer surface 754 of the spatial light modulator 105 and the touchscreen 705. In certain embodiments, the scatter features 770 may be spun on a glass surface of the spatial light modulator 105. In some embodiments, scatter features are mixed with an ultraviolet epoxy or thermally cured epoxy. When an epoxy is used, the scatter features 770 may comprise particles mixed with the epoxy, where the particles act as scatter centers to redirect the light toward the mirrored surfaces of the interferometric modulators.

Figure 15A:
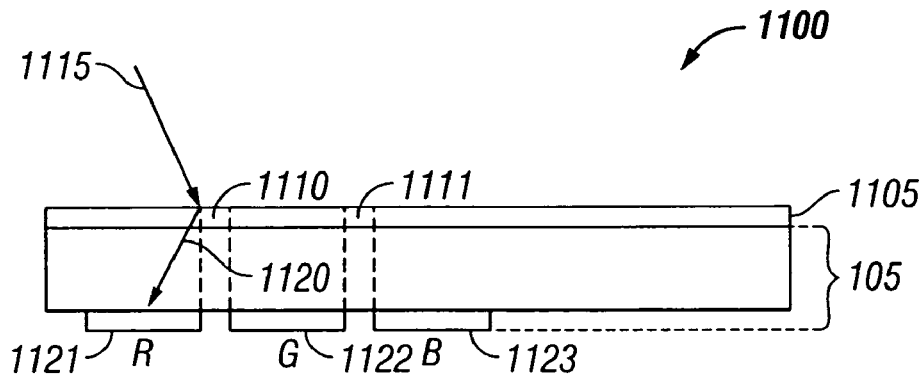
FIGS. 15A and 15B are side views of interferometric modulator devices configured with a film that directs at least a portion of light incident on the space between the active reflector areas to the active reflector areas.

FIG. 15A is a representation of one embodiment of a display 1100 that uses the light incident on inactive areas between the active reflector areas. As used herein, the term inactive area include but is not limited to the space between the reflective areas (such as the mirrors) of an interferometric modulator. As used herein, the active area includes but is not limited to the reflective areas (such as the mirrors) of an interferometric modulator, for example, that form an optical cavity.

Referring to FIG. 15A, a display 1100 includes a film 1105 connected to the outer surface of a spatial light modulator 105. Red 1121, green 1122, and blue 1123 active reflector areas are shown on the bottom of spatial light modulator 105 and represent the numerous active reflector areas (e.g., resonant optical cavities) of the display 1100. A first space 1110 separates the red active reflector area 1121 from the green active reflector area 1122, which is separated from the blue active reflector area by a second space 1111. The spaces 1110 and 1111 may be between about 2 to 10 microns wide and are spaced apart from each other by about 125 to 254 microns. Similarly, optical features in the spaces 1110 and 1111 in the film 1105 that redirect light may be about 2 to 10 microns wide and are spaced apart from each other by about 125 to 254 microns. Dimensions outside these ranges are also possible.

Generally, without the film 1105, light incident on the areas of the first space 1110 or the second space 1111 may not reach one of the active reflector areas 1121, 1122, 1123. To increase the reflectance of the interferometric modulator 1100, light incident on the inactive areas between the active reflector areas (e.g., first space 1110 and second space 1111) can be redirected to one of the active reflector areas 1121, 1122, 1123. As the location of the inactive areas and the active reflector areas is known, the external film 1105 can be configured to redirect the light incident 1115 on the film 1105 in the inactive areas 1110, 1111 back into the active reflector area 1121, 1122, 1123 (e.g., the optical cavity) as shown by arrow 1120. In some embodiments, the film 1105 includes reflectors to re-direct the light. In some embodiments, the film 1105 is configured with a customized index of refraction in the areas of the spaces 1110, 1111 to re-direct the light In other embodiments, the film 1105 can contain scattering elements in the areas of the spaces 1110, 1111 so that at least a portion of the light is scattered into and falls onto an active reflector area (e.g., the optical cavity).

Figure 15B:
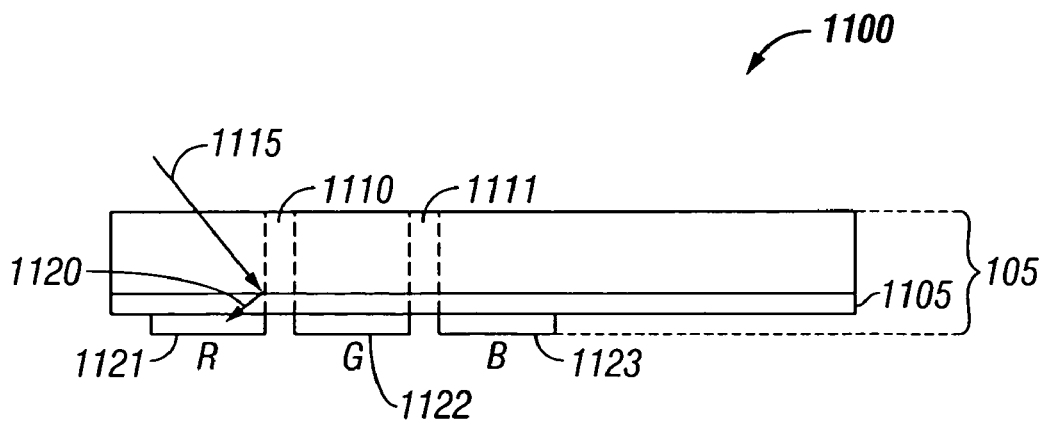

In an alternative embodiment depicted in FIG. 15B, the film 1105 may be placed above reflector areas 1121, 1122, 1123 but below the substrate of the spatial light modulator 105. The film 1105 is, thus, in the spatial light modulator 105. In this embodiment, the film 1105 is configured to redirect the light 1115, which is incident on an active area but would normally proceed to an inactive area, to the active reflector areas 1121, 1122, 1123 as shown by arrow 1120.

Figure 16A:
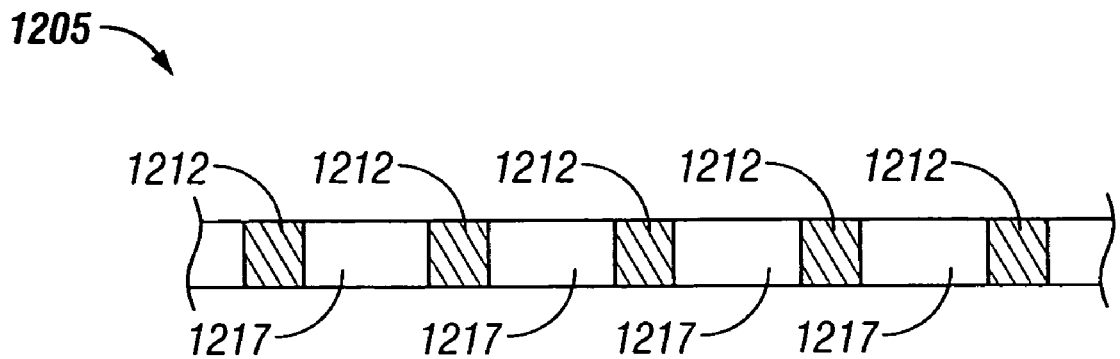
FIG. 16A is a side view of an external film having regions that scatter light.
Figure 16B:
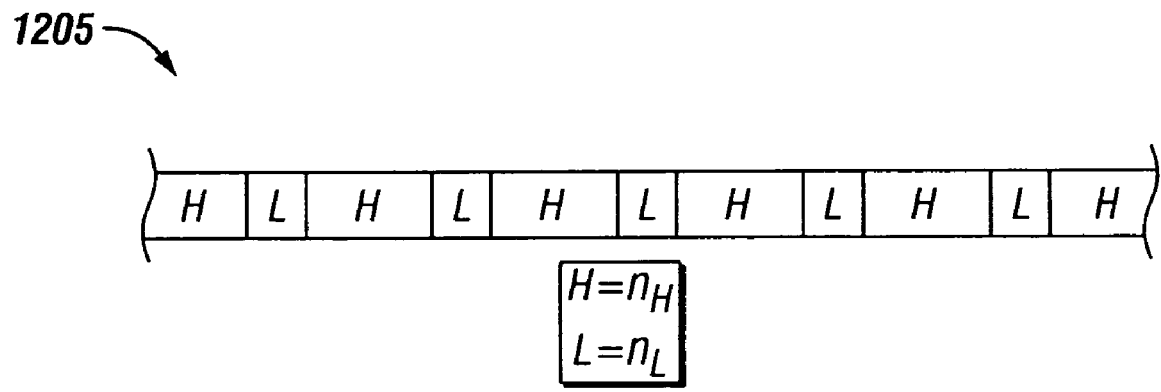
FIG. 16B is a side view of an external film having regions of higher refractive index in a matrix of lower refractive indices material that redirect light.
Figure 16C:
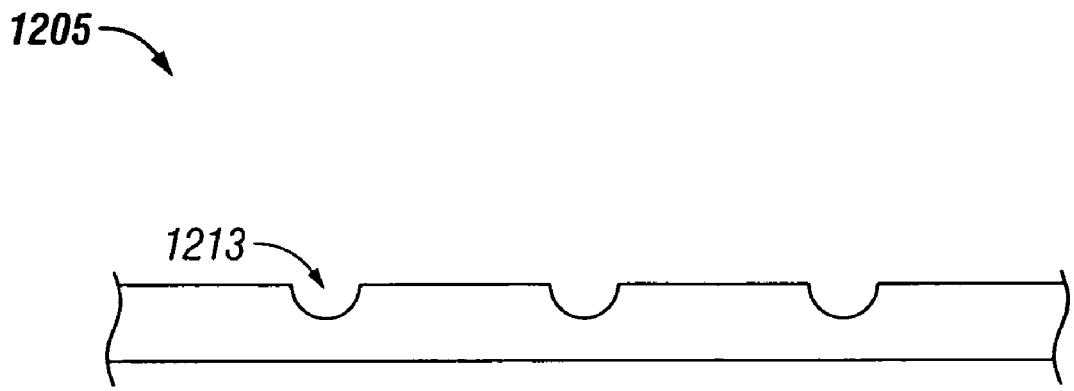
FIG. 16C is a side view of an external film having a surface having dimpled regions that act as concave lenses.
Figure 16D:
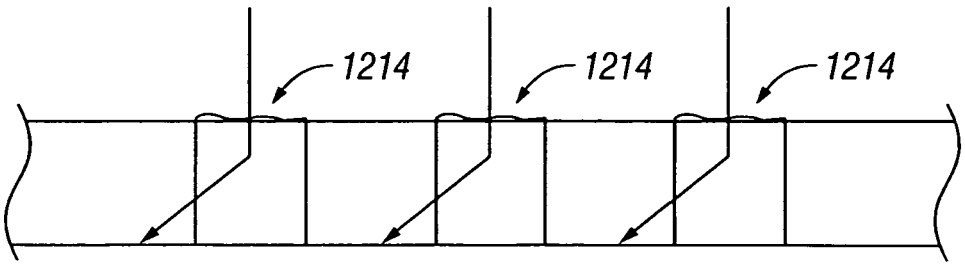
FIG. 16D is a side view of an external film having a surface comprising Fresnel lenses.
Figure 16E:
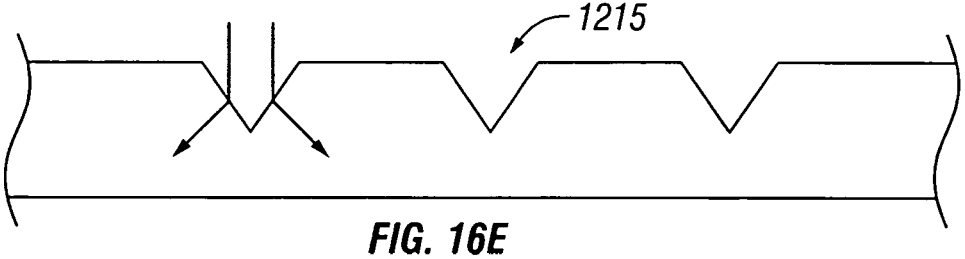
FIG. 16E is a side view of an external film having opposing sloped surfaces configured that refract light in opposite directions.
Figure 16F:
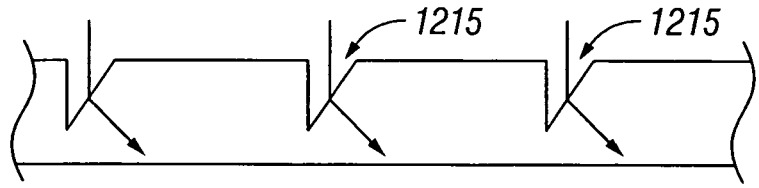
FIG. 16F is a side view of an external film having sloped surfaces configured to refract light toward one direction.
Figure 16G:
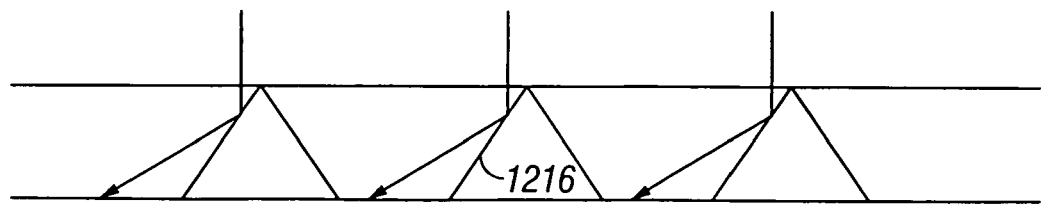
FIG. 16G is a side view of an external film having sloped surfaces configured to reflect light.

Referring to FIGS. 16A-H, various embodiments of the external film are illustrated. In FIG. 16A, external film 1205 has scatter regions 1212 that scatter light. As depicted in FIG. 16A, these scatter regions 1212 that scatter light may be interposed with regions 1217 that do not scatter light. The scatter regions 1212 may scatter light, for example, by reflection or refraction. Referring to FIG. 16B, external film 1205 has regions of higher refractive index within a matrix or film comprising material of lower refractive index. This embodiment uses TIR to redirect light. For example, if the spaces of the external film 1205 having a high refractive index are placed over the active regions of an interferometric modulator and the spaces having a low refractive index are placed over the inactive regions of the interferometric modulator, some of the light incident on the low refractive areas of the external film 1205 that would normally pass through to the inactive areas will be redirected to the active areas of the interferometric modulator. Referring to FIG. 16C, external film 1205 may have dimpled regions 1213 on a single surface of the external film that act as concave lenses. Referring to FIG. 16D, the external film 1205 may have Fresnel lenses in the regions 1214. In other embodiments, holographic or diffractive optical elements may be disposed at the regions 1214. These optical elements may scatter or diffract light and may operate as lenses, for example, with negative power that redirect light incident on the lenses toward the active regions. Referring to FIG. 16E, external film 1205 may have opposing sloped surfaces 1215 to refract light in opposite directions toward different active regions. FIG. 16F shows the external film 1205 having surfaces 1215 oriented similarly so as to refract light in the same direction. Referring to FIG. 16G, external film 1205 may have one or more reflecting sloped surfaces 1216 that reflect light toward active regions. Many other configurations are possible that also accomplish the desired redirection of light at the external film 1205.

Figure 17:
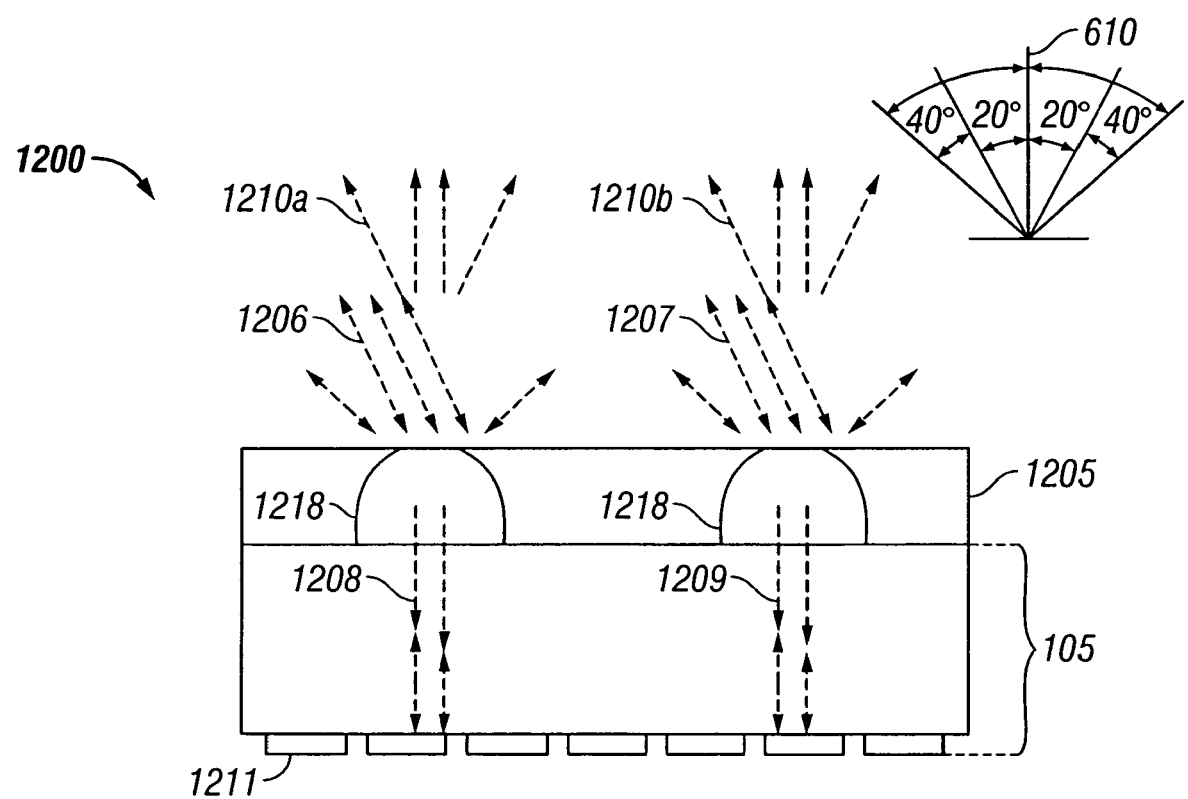
FIG. 17 is a side view of an interferometric modulator device configured with an external film that changes the direction of light that is incident on the external film, to provide the light to active reflector areas of the interferometric modulator device at an angle that is more perpendicular than its incident angle at the external film.

Referring now to FIG. 17, an interferometric modulator 1200 can include an external film 1205 that is connected to the outer surface of the spatial light modulator 105, where the film 1205 is configured to collect light incident at a wide range of angles and direct the light into at a narrower range of angles onto the light-modulating elements. In FIG. 17, the external film 1205 is configured to receive incident light 1206, 1207 at various angles and substantially collimate the light (represented by arrows 1208, 1209) and direct the light towards the active reflectors 1211. In some embodiments, such as the one shown in FIG. 17, the external film 1205 includes collimating elements 1218 that substantially collimate the light. In some embodiments, the external film 1205 includes a plurality non-imaging optical elements, e.g., compound parabolic collectors, 1218. The non-imaging optical elements, e.g., compound parabolic collectors 1218, collimate at least some of the light 1206 and 1207 that is incident on the external film 1205 at a range of angles. A portion of the light 1208 and 1209 then exits the compound parabolic collectors 1218 at a more normal angle and is directed towards the active reflectors 1211. Some of that light 1208 and 1209 is then reflected by the active reflectors 1211 and exits the display 1200 as light 1210a and 1210b egressing from the display 1200 at a limited range of angles. Accordingly, the film 1205 has a limited field-of-view. In some embodiments, at least some of the light 1210a and 1210b exits the display 1200 at a cone angle not greater than about 70 degrees from a plane 610 normal to a front surface of the external film 1205. In some embodiments, the cone angle is no more than about 65, 60, 55, 50, 45, 40, 35, 30, 25, or 20 degrees from the plane 610 normal to the front surface of the external film 1205. The collimating elements 1205 effectively limit the field-of-view of the device 1200 because light generally does not egress from the display 1200 at an angle substantially greater than the incident angle. Accordingly, the field-of-view of the external film may be about 70, 65, 60, 55, 50, 45, 40, 35, 30, 25, or 20 degrees or less as measured from the normal. These angles are half-angles. Other values outside these ranges are also possible.

Figure 18A:
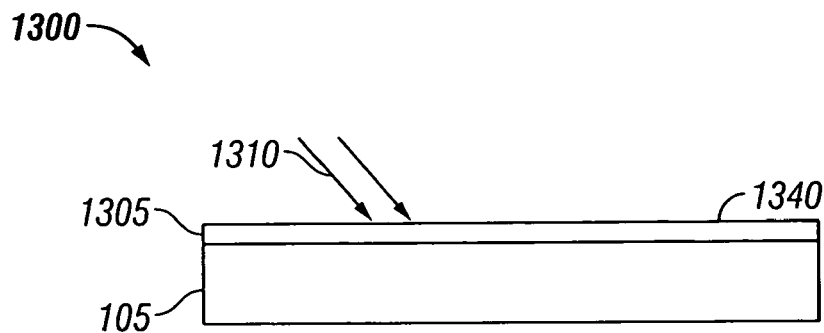
FIG. 18A is a side view of an interferometric modulator device configured with an external film comprising a diffusing element configured to collimate light directed toward the interferometric modulator device.
Figure 18B:
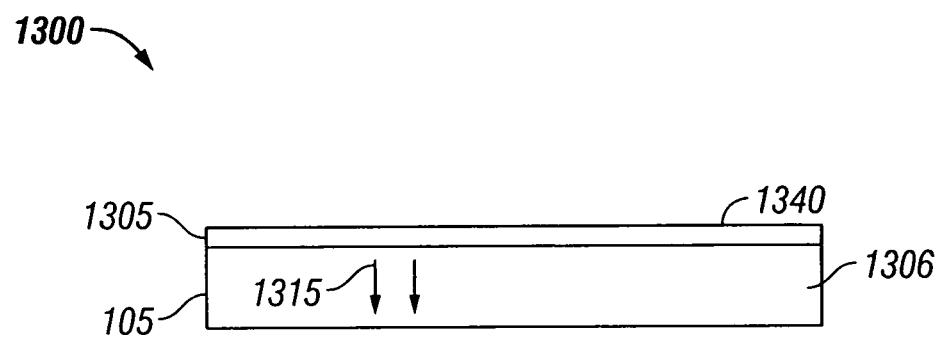
FIG. 18B is a side view of the interferometric modulator of FIG. 18A showing that the incident light is collimated and redirected to the active reflector areas of the interferometric modulator device.
Figure 18C:
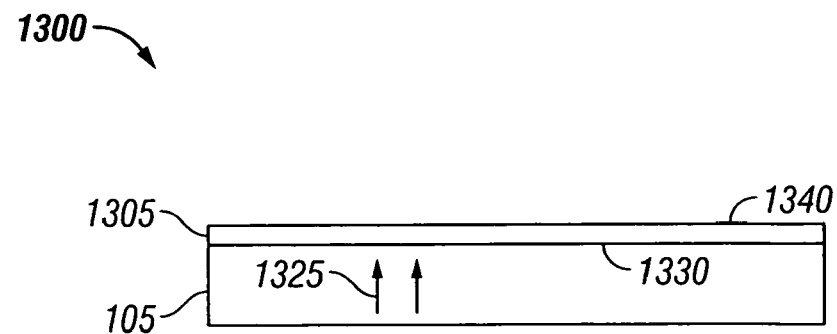
FIG. 18C is a side view of the interferometric modulator device of FIG. 18A showing that light reflected from the active areas of the interferometric modulator device is diffused by the external film.

FIGS. 18A-C depicts another embodiment of a display 1300 that includes an optical film 1305 disposed forward of the spatial light modulator 105. The optical film 1305 is configured to receive light incident at a wide range of angles and direct the light into a narrower range of angles onto the light-modulating elements. The optical film 1305 also diffuses light. In certain embodiments, the optical film 1305 is configured to diffuse light such that light incident on the diffuser element is directed to the light-modulating elements more collimated than the incident light.

In one embodiment, the optical film 1305 comprises a holographic diffuser. The holographic diffuser comprises diffractive features arranged to manipulate the light, for example, to produce a heightened intensity distribution over a narrow range of angles. In another embodiment, the optical film 1305 includes a plurality of non-imaging optical elements, e.g., a plurality of compound parabolic collectors such as described above and a thin layer of diffusing material on an upper surface 1340 of the optical film 1305. In another embodiment, the optical film 1305 includes other collimating elements with a film of diffusing material on the outer surface 1340.

Referring to FIG. 18A, the film 1305 is configured to receive incident light 1310. Referring to FIG. 18B, the film is also configured to substantially redirect the incident light 1310 (the substantially redirected light being represented by arrows 1315), which is directed to active reflectors within the spatial light modulator 105, toward the normal to the surface of the active reflectors. For incident light over the range of +/−75 degrees the redirected light can be in the range of +/−35 degrees, wherein the angles are measured from the normal. In this embodiment, the redirected light is substantially collimated. In some embodiments, the reflectors may be at a bottom portion of the spatial light modulator 105. Referring to FIG. 18C, the light 1325 reflected from the active reflectors enters the lower surface 1330 of film 1305. The film 1305 is configured to receive the reflected specular light at its lower surface 1330 and is diffused before it is emitted from the film 1305 as diffuse light. In some embodiments, the light is diffused as it propagates through the film 1305. In other embodiments, the light is diffused at the upper surface 1340 (or lower surface 1330) of the film 1305. Other configurations or values outside the ranges above are also possible.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention claimed is:

1. A display comprising:
    a light-modulating array comprising a plurality of light-modulating elements including first and second optical surfaces, the second optical surface movable with respect to the first optical surface; and
    a plurality of baffles configured to limit a field-of-view of light provided by the plurality of light-modulating elements of the display, wherein the plurality of baffles comprise spacings between individual baffles, said spacing having a dimension that provides a view angle of not more than about 40 degrees from a plane normal to a front surface of the display, wherein the angle is measured as a half-angle with respect to the normal plane.

2. The display of claim 1, wherein the plurality of baffles is incorporated in an optical layer formed over the light-modulating array.

3. The display of claim 1, wherein the light-modulating array is in a horizontal plane and the plurality of baffles comprise substantially planar surfaces that are parallel to a vertical plane.

4. The display of claim 1, wherein the plurality of baffles comprise spacings between individual baffles, said spacing having a dimension that provides a view angle of not more than about 20 degrees from a plane normal to a front surface of the display, wherein the angle is measured as a half angle with respect to the normal plane.

5. The display of claim 1, wherein the plurality of baffles are substantially opaque.

6. The display of claim 5, wherein the plurality of baffles comprise substantially planar opaque surfaces.

7. The display of claim 1, wherein the plurality of baffles comprises absorbing material.

8. The display of claim 1, wherein the plurality of baffles comprises a reflecting material.

9. The display of claim 1, further comprising:
    a processor that is in electrical communication with the light-modulating array, said processor being configured to process image data; and
    a memory device in electrical communication with said processor.

10. The display of claim 9, further comprising:
    a first controller configured to send at least one signal to the light-modulating array; and
    a second controller configured to send at least a portion of said image data to said first controller.

11. The display of claim 9, further comprising an image source module configured to send said image data to said processor.

12. The display of claim 11, wherein said image source module comprises at least one of a receiver, transceiver, and transmitter.

13. The display of claim 9, further comprising an input device configured to receive input data and to communicate said input data to said processor.

14. A display comprising:
    a light-modulating array comprising a plurality of light-modulating elements including first and second optical surfaces, the second optical surface movable with respect to the first optical surface; and
    a plurality of elements configured to limit a field-of-view of light provided by the display,
    wherein the plurality of elements configured to limit a field-of-view of the display comprise an array of light collectors comprising curved reflective surfaces shaped to collect light incident at a wide range of angles and direct the light into at a narrower range of angles onto the light-modulating elements, and
    wherein the plurality of elements restrict the field-of-view of the display to angles no more than about 70 degrees from a plane normal to a front surface of the display, wherein the angle is measured as a half angle with respect to the normal plane.

15. The display of claim 14, wherein said light collectors comprise non-imaging optical elements.

16. The display of claim 15, wherein said non-imaging optical elements comprise compound parabolic collectors.

17. The display of claim 14, wherein said reflective surfaces are symmetric about central optical axes passing through the light collectors.

18. The display of claim 14, wherein said light collectors are circularly symmetric about central optical axes passing through the light collectors.

19. The display of claim 14, wherein said curved reflective surfaces define input and output apertures for said light collectors, said output apertures being larger than said input apertures.

20. The display of claim 14, wherein the curved reflective surfaces are shaped to substantially collimate light.

21. A display comprising:
    a light-modulating array comprising a plurality of light-modulating elements including first and second optical surfaces, the second optical surface movable with respect to the first optical surface; and
    a plurality of elements configured to limit a field-of-view-of light provided by the display,
    wherein the plurality of elements configured to limit a field-of-view of the light provided by the display comprise an array of light collectors comprising curved reflective surfaces shaped to collect light incident at a wide range of angles and direct the light into at a narrower range of angles onto the light-modulating elements, and
    wherein the plurality of elements restrict the field-of-view of the display to angles no more than about 20 degrees from a plane normal to a front surface of the display, wherein the angle is measured as a half angle with respect to the normal plane.

* * * * *

UNITED STATES PATENT AND TRADEMARK OFFICE
CERTIFICATE OF CORRECTION

PATENT NO. : 7,508,571 B2
APPLICATION NO. : 11/156335
DATED : March 24, 2009
INVENTOR(S) : Gally et al.

It is certified that error appears in the above-identified patent and that said Letters Patent is hereby corrected as shown below:

At Column 5, Line 46, please delete "14a ," and insert therefore, --14a,--.

At Column 5, Line 48, please delete "16a , 16b )" and insert therefore, --16a, 16b)--.

At Column 5, Line 51, please delete "14a ," and insert therefore, --14a,--.

At Column 5, Line 52, please delete "16a ," and insert therefore, --16a,--.

At Column 5, Line 57, please delete "16a ," and insert therefore, --16a,--.

At Column 13, Line 5, please delete "diff-users" and insert therefore, --diffusers--.

At Column 13, Line 44, please delete "diff-use" and insert therefore, --diffuse--.

At Column 16, Line 28, please delete "diff-using" and insert therefore, --diffusing--.

At Column 17, Line 38, please delete "diff-using" and insert therefore, --diffusing--.

At Column 18, Line 53, after "light" please add --.--.

At Column 21, Line 18, Claim 4, please delete "half angle" and insert therefore, --half-angle--.

At Column 21, Line 25, Claim 7, please delete "comprises" and insert therefore, --comprise--.

UNITED STATES PATENT AND TRADEMARK OFFICE
CERTIFICATE OF CORRECTION

PATENT NO. : 7,508,571 B2
APPLICATION NO. : 11/156335
DATED : March 24, 2009
INVENTOR(S) : Gally et al.

It is certified that error appears in the above-identified patent and that said Letters Patent is hereby corrected as shown below:

At Column 21, Line 27, Claim 8, please delete "comprises" and insert therefore, --comprise--.

At Column 22, Line 14, Claim 14, please delete "half angle" and insert therefore, --half-angle--.

At Column 22, Line 37, Claim 21, please delete "field-of view-of" and insert therefore, --field-of-view of--.

At Column 22, Line 49, Claim 21, please delete "half angle" and insert therefore, --half-angle--.

Signed and Sealed this

Eighteenth Day of August, 2009

David J. Kappos
*Director of the United States Patent and Trademark Office*